(12) United States Patent
Chatterjee et al.

(10) Patent No.: US 10,148,530 B2
(45) Date of Patent: Dec. 4, 2018

(54) RULE BASED SUBSCRIPTION CLONING

(71) Applicant: Oracle International Corporation, Redwood Shores, CA (US)

(72) Inventors: Ramkrishna Chatterjee, Nashua, NH (US); Gopalan Arun, Saratoga, CA (US); Ramesh Vasudevan, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/624,356

(22) Filed: Feb. 17, 2015

(65) Prior Publication Data

US 2015/0365301 A1 Dec. 17, 2015

Related U.S. Application Data

(60) Provisional application No. 62/011,400, filed on Jun. 12, 2014.

(51) Int. Cl.
  *H04L 12/24* (2006.01)
  *H04L 29/08* (2006.01)
  *H04L 12/927* (2013.01)

(52) U.S. Cl.
  CPC ........ *H04L 41/5054* (2013.01); *H04L 47/808* (2013.01); *H04L 67/10* (2013.01); *H04L 67/1097* (2013.01)

(58) Field of Classification Search
  CPC .................................................. H04L 41/5054
  USPC ......................................................... 709/226
  See application file for complete search history.

(56) References Cited

U.S. PATENT DOCUMENTS

| 4,939,723 A | 7/1990 | Harley, Jr. et al. |
| 5,257,369 A | 10/1993 | Skeen et al. |
| 5,418,782 A | 5/1995 | Wasilewski |
| 5,892,909 A | 4/1999 | Grasso et al. |

(Continued)

FOREIGN PATENT DOCUMENTS

| CN | 104604201 | 5/2015 |
| CN | 104737517 A | 6/2015 |

(Continued)

OTHER PUBLICATIONS

Oracle, Identity Manager Design Console Guide, Release 9.1.0, Jun. 2008, 208 pages.

(Continued)

*Primary Examiner* — Andrew C Georgandellis
(74) *Attorney, Agent, or Firm* — Kilpatrick Townsend and Stockton LLP

(57) ABSTRACT

Aspects of the present invention relate to techniques for providing a user with access to a service provided by a cloud infrastructure system based on an existing service. A user may be provided with a clone subscription based on a base subscription to an existing service provided by the cloud infrastructure system. A clone subscription can provide the user with an environment (e.g., a service) that is designated for one use (e.g., development and testing) different from another use (e.g., production) designed for a base subscription. Changes made to a base subscription may be propagated to the clone subscription based on rules. A clone subscription can be modified to vary the clone configuration independently from the base configuration.

19 Claims, 20 Drawing Sheets

(56) References Cited

U.S. PATENT DOCUMENTS

| | | | |
|---|---|---|---|
| 5,911,143 A | 6/1999 | Deinhart et al. |
| 5,961,636 A | 10/1999 | Brooks et al. |
| 5,970,120 A | 10/1999 | Kasrai |
| 6,052,684 A | 4/2000 | Du |
| 6,075,937 A | 6/2000 | Scalzi et al. |
| 6,085,188 A | 7/2000 | Bachmann et al. |
| 6,122,640 A | 9/2000 | Pereira |
| 6,144,647 A | 11/2000 | Lopez-Torres |
| 6,151,601 A | 11/2000 | Papierniak et al. |
| 6,192,391 B1 | 2/2001 | Ohtani et al. |
| 6,222,832 B1 | 4/2001 | Proctor |
| 6,236,988 B1 | 5/2001 | Aldred |
| 6,334,193 B1 | 12/2001 | Buzsaki |
| 6,397,125 B1 | 5/2002 | Goldring et al. |
| 6,496,831 B1 | 12/2002 | Baulier et al. |
| 6,516,416 B2 | 2/2003 | Gregg et al. |
| 6,526,513 B1 | 2/2003 | Shrader et al. |
| 6,546,095 B1 | 4/2003 | Iverson et al. |
| 6,553,364 B1 | 4/2003 | Wu |
| 6,611,506 B1 | 8/2003 | Huang et al. |
| 6,633,907 B1 | 10/2003 | Spencer et al. |
| 6,650,433 B1 | 11/2003 | Keane et al. |
| 6,745,209 B2 | 6/2004 | Holenstein et al. |
| 6,895,471 B1 | 5/2005 | Tse et al. |
| 6,934,727 B2 | 8/2005 | Berkowitz et al. |
| 6,965,899 B1 | 11/2005 | Subramaniam et al. |
| 6,970,889 B2 | 11/2005 | Flanagin et al. |
| 6,976,798 B2 | 12/2005 | Keane et al. |
| 7,051,039 B1 | 5/2006 | Murthy et al. |
| 7,136,867 B1 | 11/2006 | Chatterjee et al. |
| 7,290,288 B2 | 10/2007 | Gregg et al. |
| 7,321,904 B2 | 1/2008 | Holenstein et al. |
| 7,363,332 B2 | 4/2008 | Berkowitz et al. |
| 7,383,355 B1 | 6/2008 | Berkman et al. |
| 7,409,413 B2 | 8/2008 | Martinez et al. |
| 7,428,503 B1 | 9/2008 | Groff et al. |
| 7,565,310 B2 | 7/2009 | Gao et al. |
| 7,610,585 B2 | 10/2009 | Shpeisman et al. |
| 7,664,866 B2 | 2/2010 | Wakefield |
| 7,698,398 B1 | 4/2010 | Lai |
| 7,783,746 B2 | 8/2010 | Hand et al. |
| 7,788,225 B2 | 8/2010 | Fish et al. |
| 7,790,393 B2 | 9/2010 | Lyamichev et al. |
| 7,912,930 B1 | 3/2011 | Farooqi et al. |
| 7,921,299 B2 | 4/2011 | Anantha et al. |
| 7,953,896 B2 | 5/2011 | Ward et al. |
| 7,974,943 B2 | 7/2011 | Gilbert et al. |
| 7,992,194 B2 | 8/2011 | Damodaran et al. |
| 8,095,629 B2 | 1/2012 | Ward et al. |
| 8,151,323 B2 | 4/2012 | Harris et al. |
| 8,156,083 B2 | 4/2012 | Banerjee et al. |
| 8,165,152 B2 | 4/2012 | Sammour et al. |
| 8,204,794 B1 | 6/2012 | Peng et al. |
| 8,254,396 B2 | 8/2012 | Appanna et al. |
| 8,266,616 B1 | 9/2012 | Jacquot et al. |
| 8,291,490 B1 | 10/2012 | Ahmed et al. |
| 8,321,921 B1 | 11/2012 | Ahmed et al. |
| 8,332,358 B2 | 12/2012 | Kaiser et al. |
| 8,370,303 B1 | 2/2013 | Ceschim et al. |
| 8,380,880 B2 | 2/2013 | Gulley et al. |
| 8,387,136 B2 | 2/2013 | Lee et al. |
| 8,387,137 B2 | 2/2013 | Lee et al. |
| 8,402,514 B1 | 3/2013 | Thompson et al. |
| 8,434,129 B2 | 4/2013 | Kannappan et al. |
| 8,468,244 B2 | 6/2013 | Redlich et al. |
| 8,499,005 B2 | 7/2013 | Brooks et al. |
| 8,515,907 B2 | 8/2013 | Burjoski |
| 8,572,027 B2 | 10/2013 | Parees et al. |
| 8,572,602 B1 | 10/2013 | Colton et al. |
| 8,626,717 B2 | 1/2014 | Bendakovsky et al. |
| 8,631,477 B2 | 1/2014 | Chen et al. |
| 8,631,478 B2 | 1/2014 | Chen et al. |
| 8,656,002 B1 | 2/2014 | Adogla et al. |
| 8,666,935 B2 | 3/2014 | Evanitsky |
| 8,712,961 B2 | 4/2014 | Dwyer et al. |
| 8,738,775 B1 | 5/2014 | Adogla et al. |
| 8,769,622 B2 | 7/2014 | Chang et al. |
| 8,769,704 B2 | 7/2014 | Peddada et al. |
| 8,788,457 B2 | 7/2014 | Parees et al. |
| 8,788,663 B1 | 7/2014 | Adogla et al. |
| 8,789,157 B2 | 7/2014 | Sinn |
| 8,806,593 B1 | 8/2014 | Raphel et al. |
| 8,843,997 B1 | 9/2014 | Hare |
| 8,849,685 B2 | 9/2014 | Oden |
| 8,856,077 B1 * | 10/2014 | Roth .................. G06F 9/5072 707/638 |
| 8,856,082 B2 | 10/2014 | Hale et al. |
| 8,949,178 B2 | 2/2015 | Zhao et al. |
| 8,972,725 B2 | 3/2015 | Arun et al. |
| 9,015,114 B2 | 4/2015 | Chatterjee et al. |
| 9,137,209 B1 | 4/2015 | Brandwine et al. |
| 9,203,866 B2 | 12/2015 | Chatterjee et al. |
| 9,219,749 B2 | 12/2015 | Khalsa et al. |
| 9,244,953 B2 | 1/2016 | Vingralek et al. |
| 9,253,113 B2 | 2/2016 | Vasudevan et al. |
| 9,319,269 B2 | 4/2016 | Arun et al. |
| 9,336,030 B1 | 5/2016 | Marr et al. |
| 9,336,483 B1 | 5/2016 | Abeysooriya et al. |
| 9,397,884 B2 | 7/2016 | Chatterjee et al. |
| 9,467,355 B2 | 10/2016 | Doering et al. |
| 9,501,541 B2 | 11/2016 | Doering et al. |
| 9,542,400 B2 | 1/2017 | Doering et al. |
| 9,619,540 B2 | 4/2017 | Prathipati et al. |
| 9,621,435 B2 | 4/2017 | Vasudevan et al. |
| 9,646,069 B2 | 5/2017 | Khalsa et al. |
| 9,667,470 B2 | 5/2017 | Prathipati et al. |
| 9,734,224 B2 | 8/2017 | Chatterjee et al. |
| 9,792,338 B2 | 10/2017 | Evans et al. |
| 9,838,370 B2 | 12/2017 | Doering et al. |
| 2002/0004390 A1 | 1/2002 | Cutaia et al. |
| 2002/0007363 A1 | 1/2002 | Vaitzblit |
| 2002/0059210 A1 | 5/2002 | Makus et al. |
| 2002/0091863 A1 | 7/2002 | Schug |
| 2002/0156664 A1 | 10/2002 | Willcox et al. |
| 2003/0046342 A1 | 3/2003 | Felt et al. |
| 2003/0212991 A1 | 11/2003 | Mahajan |
| 2003/0233465 A1 | 12/2003 | Le et al. |
| 2004/0022379 A1 | 2/2004 | Klos et al. |
| 2004/0066930 A1 | 4/2004 | Bangor |
| 2004/0177133 A1 | 9/2004 | Harrison et al. |
| 2004/0243941 A1 | 12/2004 | Fish |
| 2004/0267872 A1 | 12/2004 | Serdy, Jr. et al. |
| 2005/0071209 A1 | 3/2005 | Tatavu et al. |
| 2005/0198629 A1 | 9/2005 | Vishwanath |
| 2005/0289013 A1 | 12/2005 | Goldberg |
| 2005/0289072 A1 | 12/2005 | Sabharwal |
| 2006/0059029 A1 | 3/2006 | Chalasani et al. |
| 2006/0059539 A1 | 3/2006 | Shashikumar et al. |
| 2006/0143704 A1 | 6/2006 | Rits et al. |
| 2006/0173724 A1 | 8/2006 | Trefler et al. |
| 2006/0265583 A1 | 11/2006 | Eilam et al. |
| 2006/0277595 A1 | 12/2006 | Kinser et al. |
| 2007/0005536 A1 | 1/2007 | Caswell et al. |
| 2007/0028098 A1 | 2/2007 | Baartman et al. |
| 2007/0043784 A1 | 2/2007 | Parkinson |
| 2007/0112952 A1 | 5/2007 | Sodhi et al. |
| 2007/0150480 A1 | 6/2007 | Hwang et al. |
| 2007/0169168 A1 | 7/2007 | Lim |
| 2007/0174101 A1 | 7/2007 | Li et al. |
| 2007/0203798 A1 | 8/2007 | Caballero et al. |
| 2007/0215683 A1 | 9/2007 | Koorland et al. |
| 2007/0220140 A1 | 9/2007 | Weidenschlager |
| 2007/0283147 A1 | 12/2007 | Fried et al. |
| 2008/0027825 A1 | 1/2008 | Boonie et al. |
| 2008/0059469 A1 | 3/2008 | Pruet |
| 2008/0077680 A1 | 3/2008 | Dellarole et al. |
| 2008/0080718 A1 | 4/2008 | Meijer et al. |
| 2008/0083036 A1 | 4/2008 | Ozzie et al. |
| 2008/0089520 A1 | 4/2008 | Kessler |
| 2008/0097816 A1 | 4/2008 | Freire et al. |
| 2008/0127183 A1 | 5/2008 | Emerson et al. |
| 2008/0147584 A1 | 6/2008 | Buss |
| 2008/0155039 A1 | 6/2008 | Fernandes et al. |
| 2008/0189250 A1 | 8/2008 | Cha et al. |

(56) References Cited

U.S. PATENT DOCUMENTS

| | | |
|---|---|---|
| 2008/0250074 A1 | 10/2008 | Parkinson |
| 2008/0256419 A1 | 10/2008 | Wojewoda et al. |
| 2008/0256606 A1 | 10/2008 | Koikara et al. |
| 2008/0270597 A1 | 10/2008 | Tenenti |
| 2008/0281617 A1 | 11/2008 | Conrad et al. |
| 2008/0313716 A1 | 12/2008 | Park |
| 2009/0024522 A1 | 1/2009 | Reunert et al. |
| 2009/0037492 A1 | 2/2009 | Baitalmal et al. |
| 2009/0063580 A1 | 3/2009 | Allen et al. |
| 2009/0089407 A1 | 4/2009 | Chalupa et al. |
| 2009/0106578 A1 | 4/2009 | Dilman et al. |
| 2009/0126007 A1 | 5/2009 | Zamberlan et al. |
| 2009/0157457 A1 | 6/2009 | Huuhtanen et al. |
| 2009/0178102 A1 | 7/2009 | Alghathbar et al. |
| 2009/0205018 A1 | 8/2009 | Ferraiolo et al. |
| 2009/0217267 A1 | 8/2009 | Gebhart et al. |
| 2009/0254572 A1 | 10/2009 | Redlich et al. |
| 2009/0259683 A1 | 10/2009 | Murty |
| 2009/0265753 A1 | 10/2009 | Anderson et al. |
| 2009/0276771 A1 | 11/2009 | Nickolov et al. |
| 2009/0293046 A1 | 11/2009 | Cheriton |
| 2009/0300604 A1 | 12/2009 | Barringer |
| 2009/0320093 A1 | 12/2009 | Glazier et al. |
| 2010/0114618 A1* | 5/2010 | Wilcock ............... G06Q 10/06 705/7.37 |
| 2010/0161552 A1 | 6/2010 | Murarasu et al. |
| 2010/0191774 A1 | 7/2010 | Mason, Jr. et al. |
| 2010/0198730 A1 | 8/2010 | Ahmed et al. |
| 2010/0205152 A1 | 8/2010 | Ansari et al. |
| 2010/0211781 A1 | 8/2010 | Auradkar et al. |
| 2010/0248681 A1 | 9/2010 | Phills |
| 2010/0251242 A1 | 9/2010 | Sivasubramanian et al. |
| 2010/0251339 A1 | 9/2010 | McAlister |
| 2010/0269049 A1 | 10/2010 | Fearon |
| 2010/0280892 A1 | 11/2010 | Uzunalioglu et al. |
| 2010/0280958 A1 | 11/2010 | Hasson et al. |
| 2010/0306818 A1 | 12/2010 | Li et al. |
| 2010/0318393 A1 | 12/2010 | Acker et al. |
| 2010/0332629 A1 | 12/2010 | Cotugno et al. |
| 2010/0333116 A1 | 12/2010 | Prahlad et al. |
| 2011/0004679 A1* | 1/2011 | Lo ................... G05B 19/41845 709/223 |
| 2011/0029983 A1 | 2/2011 | Lu et al. |
| 2011/0035444 A1 | 2/2011 | Hill |
| 2011/0053555 A1 | 3/2011 | Cai et al. |
| 2011/0072436 A1 | 3/2011 | Gilat et al. |
| 2011/0103566 A1 | 5/2011 | Sarkar et al. |
| 2011/0112939 A1 | 5/2011 | Nelson et al. |
| 2011/0126207 A1 | 5/2011 | Wipfel et al. |
| 2011/0131146 A1 | 6/2011 | Skutnik |
| 2011/0131309 A1 | 6/2011 | Akiyama et al. |
| 2011/0137805 A1 | 6/2011 | Brookbanks et al. |
| 2011/0138047 A1 | 6/2011 | Brown et al. |
| 2011/0138051 A1 | 6/2011 | Dawson et al. |
| 2011/0138055 A1 | 6/2011 | Daly et al. |
| 2011/0145199 A1 | 6/2011 | Prasad Palagummi |
| 2011/0153969 A1 | 6/2011 | Petrick |
| 2011/0211686 A1 | 9/2011 | Wall et al. |
| 2011/0218813 A1 | 9/2011 | Addala et al. |
| 2011/0218842 A1 | 9/2011 | Addala et al. |
| 2011/0218924 A1 | 9/2011 | Addala et al. |
| 2011/0218925 A1 | 9/2011 | Addala et al. |
| 2011/0219218 A1 | 9/2011 | Addala et al. |
| 2011/0225081 A1 | 9/2011 | Kittelsen et al. |
| 2011/0225461 A1 | 9/2011 | Wookey |
| 2011/0231280 A1 | 9/2011 | Farah |
| 2011/0238458 A1 | 9/2011 | Purcell et al. |
| 2011/0276951 A1 | 11/2011 | Jain |
| 2011/0288968 A1 | 11/2011 | King et al. |
| 2011/0295998 A1 | 12/2011 | Ferris et al. |
| 2011/0296000 A1 | 12/2011 | Ferris et al. |
| 2011/0296018 A1 | 12/2011 | Deng et al. |
| 2011/0307523 A1 | 12/2011 | Balani et al. |
| 2011/0313902 A1 | 12/2011 | Liu et al. |
| 2011/0314466 A1 | 12/2011 | Berg et al. |
| 2011/0320605 A1 | 12/2011 | Kramer et al. |
| 2012/0005341 A1 | 1/2012 | Seago et al. |
| 2012/0032945 A1 | 2/2012 | Dare et al. |
| 2012/0036220 A1 | 2/2012 | Dare et al. |
| 2012/0036245 A1 | 2/2012 | Dare et al. |
| 2012/0036440 A1 | 2/2012 | Dare et al. |
| 2012/0036442 A1 | 2/2012 | Dare et al. |
| 2012/0036552 A1 | 2/2012 | Dare et al. |
| 2012/0041844 A1* | 2/2012 | Shen ..................... G06Q 30/06 705/26.61 |
| 2012/0045854 A1 | 2/2012 | Matsuoka et al. |
| 2012/0047357 A1 | 2/2012 | Bealkowski |
| 2012/0054624 A1 | 3/2012 | Owens, Jr. et al. |
| 2012/0066755 A1 | 3/2012 | Peddada et al. |
| 2012/0072555 A1 | 3/2012 | DeLuca et al. |
| 2012/0079134 A1 | 3/2012 | Outhred et al. |
| 2012/0084351 A1 | 4/2012 | Yato et al. |
| 2012/0089426 A1 | 4/2012 | Borucki |
| 2012/0096521 A1 | 4/2012 | Peddada |
| 2012/0102160 A1* | 4/2012 | Breh ..................... G06F 9/5061 709/220 |
| 2012/0110583 A1 | 5/2012 | Balko et al. |
| 2012/0131166 A1 | 5/2012 | Barbedette et al. |
| 2012/0131194 A1 | 5/2012 | Morgan |
| 2012/0136936 A1 | 5/2012 | Quintuna |
| 2012/0150693 A1 | 6/2012 | Dueck et al. |
| 2012/0159494 A1 | 6/2012 | Shafiee et al. |
| 2012/0159503 A1 | 6/2012 | Shafiee et al. |
| 2012/0198073 A1 | 8/2012 | Srikanth et al. |
| 2012/0221454 A1 | 8/2012 | Morgan |
| 2012/0226796 A1 | 9/2012 | Morgan |
| 2012/0226808 A1 | 9/2012 | Morgan |
| 2012/0246248 A1 | 9/2012 | Arita |
| 2012/0271949 A1 | 10/2012 | Radhakrishnan et al. |
| 2012/0284776 A1 | 11/2012 | Sundaram et al. |
| 2012/0297441 A1 | 11/2012 | Boldyrev et al. |
| 2012/0304191 A1 | 11/2012 | Morgan |
| 2012/0311153 A1 | 12/2012 | Morgan |
| 2012/0311154 A1 | 12/2012 | Morgan |
| 2012/0311657 A1 | 12/2012 | Boldyrev et al. |
| 2012/0324092 A1 | 12/2012 | Brown et al. |
| 2012/0331050 A1 | 12/2012 | Wilbur et al. |
| 2013/0007195 A1 | 1/2013 | Rinard et al. |
| 2013/0007265 A1 | 1/2013 | Benedetti et al. |
| 2013/0014107 A1 | 1/2013 | Kirchhofer |
| 2013/0030859 A1 | 1/2013 | Jung et al. |
| 2013/0042005 A1 | 2/2013 | Boss et al. |
| 2013/0047230 A1 | 2/2013 | Krishnan et al. |
| 2013/0054763 A1 | 2/2013 | Van der Merwe et al. |
| 2013/0055251 A1 | 2/2013 | Anderson et al. |
| 2013/0086269 A1 | 4/2013 | Bairavasundaram et al. |
| 2013/0103640 A1 | 4/2013 | Rehman |
| 2013/0110943 A1 | 5/2013 | Menon et al. |
| 2013/0117157 A1 | 5/2013 | Iyoob et al. |
| 2013/0124401 A1 | 5/2013 | Del Real |
| 2013/0139152 A1 | 5/2013 | Chang et al. |
| 2013/0145300 A1 | 6/2013 | Mackay et al. |
| 2013/0152183 A1 | 6/2013 | Plewnia et al. |
| 2013/0204994 A1 | 8/2013 | Deshmukh et al. |
| 2013/0212160 A1 | 8/2013 | Lawson et al. |
| 2013/0212420 A1 | 8/2013 | Lawson et al. |
| 2013/0227137 A1 | 8/2013 | Damola et al. |
| 2013/0254882 A1 | 9/2013 | Kannappan et al. |
| 2013/0262556 A1 | 10/2013 | Xu et al. |
| 2013/0268480 A1 | 10/2013 | Dorman |
| 2013/0268491 A1 | 10/2013 | Chung et al. |
| 2013/0275509 A1 | 10/2013 | Micucci et al. |
| 2013/0283350 A1 | 10/2013 | Afek et al. |
| 2013/0290710 A1 | 10/2013 | Broder et al. |
| 2013/0298210 A1 | 11/2013 | Wright et al. |
| 2013/0298212 A1 | 11/2013 | Shah et al. |
| 2013/0318241 A1 | 11/2013 | Acharya et al. |
| 2013/0332984 A1 | 12/2013 | Sastry et al. |
| 2013/0332985 A1 | 12/2013 | Sastry et al. |
| 2013/0336235 A1 | 12/2013 | Meyer et al. |
| 2014/0020054 A1 | 1/2014 | Lim |
| 2014/0059002 A1 | 2/2014 | Lockhart et al. |
| 2014/0059226 A1 | 2/2014 | Messerli et al. |
| 2014/0074539 A1 | 3/2014 | Doering et al. |

(56) References Cited

U.S. PATENT DOCUMENTS

| | | |
|---|---|---|
| 2014/0074540 A1 | 3/2014 | Evans et al. |
| 2014/0074544 A1 | 3/2014 | Seetharam et al. |
| 2014/0074637 A1 | 3/2014 | Hammad |
| 2014/0074659 A1 | 3/2014 | Chatterjee et al. |
| 2014/0074788 A1 | 3/2014 | Chatterjee et al. |
| 2014/0074793 A1 | 3/2014 | Doering et al. |
| 2014/0074999 A1 | 3/2014 | Khalsa et al. |
| 2014/0075016 A1 | 3/2014 | Chatterjee et al. |
| 2014/0075027 A1 | 3/2014 | Chatterjee et al. |
| 2014/0075031 A1 | 3/2014 | Doering et al. |
| 2014/0075032 A1 | 3/2014 | Vasudevan et al. |
| 2014/0075033 A1 | 3/2014 | Doering et al. |
| 2014/0075034 A1 | 3/2014 | Vasudevan et al. |
| 2014/0075239 A1 | 3/2014 | Prathipati et al. |
| 2014/0075499 A1 | 3/2014 | Arun et al. |
| 2014/0075501 A1 | 3/2014 | Srinivasan et al. |
| 2014/0075565 A1 | 3/2014 | Srinivasan et al. |
| 2014/0082749 A1 | 3/2014 | Holland et al. |
| 2014/0141743 A1 | 5/2014 | Shaw |
| 2014/0143083 A1 | 5/2014 | Prathipati et al. |
| 2014/0192717 A1 | 7/2014 | Liu et al. |
| 2014/0201345 A1 | 7/2014 | Abuelsaad et al. |
| 2014/0237502 A1 | 8/2014 | Kelsen et al. |
| 2014/0280800 A1 | 9/2014 | Verchere et al. |
| 2014/0280943 A1 | 9/2014 | Bobrov et al. |
| 2014/0372533 A1 | 12/2014 | Fu et al. |
| 2015/0067171 A1 | 3/2015 | Yum et al. |
| 2015/0074279 A1 | 3/2015 | Maes et al. |
| 2015/0131674 A1 | 5/2015 | Kao et al. |
| 2015/0156218 A1 | 6/2015 | Arun et al. |
| 2015/0186408 A1 | 7/2015 | Zhao et al. |
| 2015/0227415 A1 | 8/2015 | Alves et al. |
| 2015/0254286 A1 | 9/2015 | Dutta et al. |
| 2015/0363724 A1 | 12/2015 | Chatterjee et al. |
| 2015/0365301 A1 | 12/2015 | Chatterjee et al. |
| 2016/0028581 A1 | 1/2016 | Khalsa et al. |
| 2016/0070772 A1 | 3/2016 | Chatterjee et al. |
| 2016/0105372 A1 | 4/2016 | Vasudevan et al. |
| 2017/0063615 A1 | 3/2017 | Yang et al. |
| 2017/0230235 A1 | 8/2017 | Khalsa et al. |
| 2017/0244613 A1 | 8/2017 | Vasudevan et al. |
| 2017/0331668 A1 | 11/2017 | Prathipati et al. |

FOREIGN PATENT DOCUMENTS

| | | |
|---|---|---|
| CN | 104756460 | 7/2015 |
| EP | 0538464 | 4/1993 |
| EP | 1914951 | 4/2008 |
| EP | 2458548 | 5/2012 |
| EP | 2893683 | 7/2015 |
| EP | 2893685 | 7/2015 |
| JP | 2012079210 | 4/2012 |
| JP | 2012084129 | 4/2012 |
| JP | 2012511293 | 5/2012 |
| JP | 2015529366 | 10/2015 |
| JP | 2015529366 A | 10/2015 |
| JP | 2015529367 | 10/2015 |
| JP | 2016-500854 A | 1/2016 |
| WO | 2009018584 | 2/2009 |
| WO | 2010149222 | 12/2010 |
| WO | 2010151273 | 12/2010 |
| WO | 2012006638 | 1/2012 |
| WO | 2012047932 | 4/2012 |
| WO | 2012070993 | 5/2012 |
| WO | 2014039772 | 3/2014 |
| WO | 2014039882 | 3/2014 |
| WO | 2014039918 | 3/2014 |
| WO | 2014039919 | 3/2014 |
| WO | 2014039921 | 3/2014 |
| WO | 2015191119 A1 | 12/2015 |

OTHER PUBLICATIONS

Buyya, Cloud Computing Principles and Paradigms, 2011, 674 pages.

Chong et al., ISVs are from Mars, and Hosters are from Venus, https://msdn.microsoft.com/en-us/library/bb891759.aspx, Nov. 2007, 28 pages.

Dan et al., Web services on demand: WSLA-driven automated management, IBM Systems Journal vol. 43 Issue: 1, 2004, pp. 136-158.

Haslam, Simon. Virtualisation arrives for Exalogic 2—Details from Launch Event. Jul. 26, 2012 [retrieved on Jun. 2, 2015]. Retrieved from the Internet <URL: http://www.veriton.co.uk!roller/fmw/entry/exalogic_2_details_from_launch>.

Keahey et al., Virtual Workspaces for Scientific Applications, 2007, pp. 1-5.

U.S. Appl. No. 13/907,728, Non-Final Office Action dated Jul. 2, 2015, 14 pages.

U.S. Appl. No. 13/907,616, Non-Final Office Action dated Dec. 4, 2015, 9 pages.

U.S. Appl. No. 13/844,018, Final Office Action dated Dec. 14, 2015, 21 pages.

U.S. Appl. No. 13/907,652, Final Office Action dated Dec. 17, 2015, 10 pages.

U.S. Appl. No. 13/907,728, Final Office Action dated Dec. 17, 2015, 16 pages.

U.S. Appl. No. 14/618,791, Notice of Allowance dated Dec. 21, 2015, 7 pages.

U.S. Appl. No. 14/618,791, Supplemental Notice of Allowability dated Jan. 6, 2016, 2 pages.

U.S. Appl. No. 13/836,625, Final Office Action dated Jan. 13, 2016, 46 pages.

U.S. Appl. No. 13/907,652, Non-Final Office Action dated Feb. 19, 2016, 11 pages.

U.S. Appl. No. 13/843,613, Non-Final Office Action dated Mar. 21, 2016, 12 pages.

U.S. Appl. No. 13/841,243, Notice of Allowance dated Mar. 22, 2016, 8 pages.

Oracle White Papers, Delivering Database as a Service (DBaaS) using Oracle Enterprise Manager 12c, Available online at:URL:http://www.oracle.com/technetwork/oem /cloud-mgmt/dbaasoverview-wp-1915651.pdf, Oct. 2013, 21 pages.

European Application No. 13766777.0, Office Action dated Feb. 10, 2016, 5 pages.

International Application No. PCT/US2015/016214, Written Opinion dated Jun. 3, 2016, 5 pages.

U.S. Appl. No. 13/841,768, Final Office Action dated Jun. 17, 2016, 13 pages.

U.S. Appl. No. 13/841,994, Final Office Action dated May 19, 2016, 10 pages.

U.S. Appl. No. 13/844,018, Notice of Allowance dated Jul. 14, 2016, 9 pages.

U.S. Appl. No. 13/906,835, Non-Final Office Action dated Apr. 13, 2016, 14 pages.

U.S. Appl. No. 13/907,616, Final Office Action dated Jun. 28, 2016, 9 pages.

U.S. Appl. No. 13/907,689, Notice of Allowance dated Apr. 22, 2016, 8 pages.

U.S. Appl. No. 14/664,528, Non-Final Office Action dated May 9, 2016, 19 pages.

U.S. Appl. No. 14/877,835, Non-Final Office Action dated Jun. 17, 2016, 12 pages.

Oracle—Breaking Cloud Security Barriers with Identity Management Oracle, 2010, 37 pages.

Oracle Identity Management 11g—An Oracle Whitepaper, Jul. 2010, 61 pages.

Oracle Unveils Oracle Public Cloud Oracle, Oct. 5, 2011, 19 pages.

An Introduction to Role-Based Access Control, NIST/ITL Bulletin, retrieved from the Internet: URL: http://csrc.nist.gov/groups/SNS/

(56) References Cited

OTHER PUBLICATIONS rbac/documents/design_implementation/Intro_role_based_access. htm on Oct. 22, 2013, Dec. 1995, 5 pages.
Basic Traversals, The Neo4J Manual, Neo Technology, Inc., 2012, 7 pages.
LDAP Authentication Overview, Juniper Networks, Inc., 1999-2010, 4 pages.
Oracle Internet Directory Administrator's Guide: Introduction to LDAP and Oracle Internet Directory, Oracle, 10g Release 2, B14082-02, retrieved from the Internet: URL: http://docs.oracle.com/cd/B14099_19/idmanage.1012/b14082/intro.htm on Oct. 1, 2013, 1999, 9 pages.
The Oracle Identity Management Platform: Identity Services at Internet Scale, Oracle, Jul. 2012, 20 pages.
Using ldapsearch, Red Hat Directory Server 8.2 Administration Guide for managing Directory Server instances Edition 8.2.8 Red Hat, Inc., 2010, 3 pages.
XACML v3.0 Hierarchical Resource Profile Version 1.0, Oasis, Working Draft 7, retrieved from the Internet: URL: http://xml.coverpages.org/XACML-v30-HierarchicalResourceProfile-WD7.pdf on Aug. 29, 2013, Apr. 1, 2009, 22 pages.
Afgan et al., CloudMan as a Tool Execution Framework for the Cloud, MIPRO, 2012 Proceedings of the 35th, International Convention, IEEE, XP032201952, ISBN: 978-1-4673-2577-6, May 21, 2012, pp. 437-441.
Alcaraz Calero et al., Toward a Multi-Tenancy Authorization System for Cloud Services, IEEE Computer and Realibily Societies, Nov./Dec. 2010, 8 pages.
Anthony et al., Consolidation Best Practices: Oracle Database 12c plugs you into the cloud, Oracle White Paper, retrieved from the Internet: URL: http://www.oracle.com/us/products/database/database-private-cloud-wp-360048.pdf on Oct. 1, 2013, Jul. 2013, 30 pages.
Bastos et al., Towards a Cloud-Based Environment for Space Systems Concept Design, Information Society (I-Society), International Conference, IEEE, XP032224790, ISBN: 978-1-4673-0838-0, 2012, pp. 478-483.
Bierman et al., Network Configuration Protocol (NETCONF) Access Control Model, Internet Engineering Task Force, RFC 6536, retrieved from the Internet: URL: http://tools.ietf.org/html/rfc6536 on Aug. 29, 2013, Mar. 2012, 50 pages.
Chanliau et al., Oracle Fusion Middleware: Oracle Platform Security Services (OPSS) FAQ, Oracle, retrieved from the Internet: URL: http://www.oracle.com/technetwork/testcontent/opss-faq-131489.pdf on Oct. 1, 2013, Jul. 2010, 6 pages.
Chiba et al., Dynamic Authorization Extension to Remote Authentication Dial in User Service (RADIUS), Network Working Group, RFC 5176, retrieved from the Internet: URL: http://tools.ietf.org/html/rfc5176 on Aug. 29, 2013, Jan. 2008, 35 pages.
Clemm et al., Web Distributed Authoring and Versioning (WebDAV) Access Control Protocol, Network Working Group, RFC 3744, retrieved from the Internet: URL: http://www.ietf.org/rfc/rfc3744.txt on Aug. 29, 2013. May 2004, 66 pages.
Datta et al., Oracle Fusion Middleware Developer's Guide for Oracle Identity Manager, Oracle, 11g Release 2, E27150-08, retrieved from the Internet: URL: http://docs.oracle.com/cd/E37115_01/dev.1112/e27150/toc.htm on Oct. 1, 2013, Sep. 2013, 1102 pages.
Demarest et al., Oracle Cloud Computing, An Oracle White Paper, Oracle Corporation, Redwood Shores, CA, May 2010, 22 pages.
Emig et al., An Access Control Metamodel for Web Service-Oriented Architecture, IEEE, 2007, pp. 1-8.
Hunter, LDAP Searching—Setting the Scope Parameters, retrieved from the Internet: URL: http://www.idevelopment.info/data/LDAP/LDAP_Resources/SEARCH_Setting_the_SCOPE_Parameter.shtml on Dec. 2, 2013, 1998-2013, 2 pages.
Jahid et al., MyABDAC: Compiling XACML Policies for Attribute-Based Database Access Control, ACM, Feb. 23, 2011, pp. 97-108.
Kagal et al., A Policy Language for a Pervasive Computing Environment, Proceedings of the 4th IEEE International Workshop on Policies for Distributed Systems and Networks, 2003, pp. 63-74.
Koved et al., Access Rights Analysis for Java, Proceedings of the 17th ACM SIGPLAN conference on Object-oriented programming, systems, languages, and applications, 2002, pp. 359-372.
Lau et al., Best Practices for access control in multi-tenant cloud solutions using Tivoli Access Manager, IBM, DeveloperWorks, May 1, 2011, 6 pages.
Paul et al., Architectures for the future networks and the next generation Internet: A survey, Computer Communications, Elsevier Science, Publishers BV, Amsterdam, NL,Department of Computer Science and Engineering, Washington University in Saint Louis. United States, XP027476826, ISSN: 0140-3664, DOI: 10.1016/J.COMCOM.2010.08.001, Jan. 15, 2011, pp. 2-42.
Rasheed et al., Multi-Tenancy on Private Cloud Enlighten, Feb. 2012, 20 pages.
Subi et al., Oracle Fusion Middleware Application Security Guide, Oracle, 11g Release 1, E10043-09, retrieved from the Internet: URL: http://docs.oracle.com/cd/E21764_01/core.1111/e10043/underjps.htm on Oct. 1, 2013, May 2011, 834 pages.
Teger et al., Oracle Fusion Middleware Developer's Guide for Oracle Access Management, Oracle, 11g Release 2, E27134-06, retrieved from the Internet: URL: http://docs.oracle.com/cd/E37115_01/dev.1112/e27134/toc.htm on Oct. 1, 2013, Jul. 2013, 372 pages.
Teger, Oracle Fusion Middleware Developer's Guide for Oracle Entitlements Server, Oracle, 11g Release 1, E27154-01, retrieved from the Internet: URL:http://docs.oracle.com/cd/E27559_01/dev.1112/e27154/handle_auth_calls.htm on Oct. 1, 2013, Jul. 2012, 132 pages.
Tsai et al., Role-Based Access-Control Using Reference Ontology in Clouds, IEEE, 2011 Tenth International Symposium on Autonomous Decentralized Systems, 2011, pp. 121-128.
Wainright, Oracle Public Cloud—An Enterprise Cloud for Business Critical Applications, Oracle, 2011, 39 pages.
U.S. Appl. No. 13/835,307, Non-Final Office Action dated Feb. 18, 2015, 12 pages.
U.S. Appl. No. 13/838,113, Non-Final Office Action dated Aug. 28, 2014, 14 pages.
U.S. Appl. No. 13/838,113, Notice of Allowance dated Feb. 23, 2015, 15 pages.
U.S. Appl. No. 13/838,537, Non-Final Office Action dated Sep. 11, 2014, 22 pages.
U.S. Appl. No. 13/838,537, Notice of Allowance dated Feb. 4, 2015, 19 pages.
U.S. Appl. No. 13/838,813, Final Office Action dated Dec. 4, 2014, 24 pages.
U.S. Appl. No. 13/838,813, Non-Final Office Action dated Aug. 14, 2014, 22 pages.
U.S. Appl. No. 13/840,943, Non-Final Office Action dated Dec. 18, 2014, 10 pages.
U.S. Appl. No. 13/842,269, Non-Final Office Action dated Jun. 5, 2014, 12 pages.
U.S. Appl. No. 13/842,269, Notice of Allowance dated Nov. 3, 2014, 8 pages.
U.S. Appl. No. 13/842,269, Supplemental Notice of Allowability dated Feb. 3, 2015, 2 pages.
U.S. Appl. No. 13/842,833, Notice of Allowance dated Dec. 15, 2014, 11 pages.
U.S. Appl. No. 13/843,613, Non-Final Office Action dated Jan. 23, 2015, 17 pages.
U.S. Appl. No. 13/907,689, Non-Final Office Action dated Jan. 7, 2015, 11 pages.
U.S. Appl. No. 14/019,051, Non-Final Office Action dated Nov. 20, 2014, 5 pages.
International Application No. PCT/US2013/058426, International Preliminary Report on Patentability dated Dec. 5, 2014, 6 pages.
International Application No. PCT/US2013/058426, International Search Report and Written Opinion dated Nov. 8, 2013, 9 pages.
International Application No. PCT/US2013/058426, Written Opinion dated Aug. 19, 2014, 7 pages.
International Application No. PCT/US2013/058596, International Preliminary Report on Patentability dated Dec. 5, 2014, 6 pages.
International Application No. PCT/US2013/058596, International Search Report and Written Opinion dated Nov. 22, 2013, 9 pages.

(56) References Cited

OTHER PUBLICATIONS

International Application No. PCT/US2013/058596, Written Opinion dated Aug. 19, 2014, 6 pages.
International Application No. PCT/US2013/058638, International Search Report and Written Opinion dated Jan. 8, 2014, 11 pages.
International Application No. PCT/US2013/058639, International Search Report and Written Opinion dated Jan. 8, 2014, 10 pages.
International Application No. PCT/US2013/058642, International Preliminary Report on Patentability dated Jan. 20, 2015, 10 pages.
International Application No. PCT/US2013/058642, International Search Report & Written Opinion dated Feb. 7, 2014, 17 pages.
International Application No. PCT/US2013/058642, Invitation to Restrict or Pay Additional Fees dated Jul. 23, 2014, 3 pages.
International Application No. PCT/US2013/058642, Written Opinion dated Sep. 11, 2014, 8 pages.
Oracle Service Contracts, User Guide, Release 12, Oracle, Part No. B25717-02, Jun. 2007, 534 pages.
International Application No. PCT/US2013/058638, International Preliminary Report on Patentability dated Jun. 12, 2015, 8 pages.
International Application No. PCT/US2013/058638, Written Opinion dated Apr. 22, 2015, 8 pages.
International Application No. PCT/US2013/058639, International Preliminary Report on Patentability dated Sep. 24, 2015, 8 pages.
International Application No. PCT/US2013/058639, Written Opinion dated Jul. 7, 2015, 6 pages.
International Application No. PCT/US2015/016214, International Search Report and Written Opinion dated May 11, 2015, 11 pages.
U.S. Appl. No. 13/835,307, Notice of Allowance dated Jul. 7, 2015, 5 pages.
U.S. Patent Application No. 13/836,625, Non-Final Office Action dated Jun. 19, 2015, 41 pages.
U.S. Appl. No. 13/840,943, Notice of Allowance dated Jun. 29, 2015, 10 pages.
U.S. Appl. No. 13/841,243, Non-Final Office Action dated Jul. 15, 2015, 15 pages.
U.S. Appl. No. 13/841,768, Non-Final Office Action dated Oct. 6, 2015, 11 pages.
U.S. Appl. No. 13/842,833, Corrected Notice of Allowability dated Mar. 30, 2015, 2 pages.
U.S. Appl. No. 13/843,613, Final Office Action dated Jun. 2, 2015, 20 pages.
U.S. Appl. No. 13/906,835, Final Office Action dated Aug. 7, 2015, 21 pages.
U.S. Appl. No. 13/906,835, Non-Final Office Action dated Mar. 20, 2015, 16 pages.
U.S. Appl. No. 13/907,652, Non-Final Office Action dated Jun. 3, 2015, 10 pages.
U.S. Appl. No. 13/907,689, Advisory Action dated Aug. 12, 2015, 2 pages.
U.S. Appl. No. 13/907,689, Final Office Action dated May 21, 2015, 12 pages.
U.S. Appl. No. 13/907,689, Non-Final Office Action dated Sep. 16, 2015, 17 pages.
U.S. Appl. No. 13/909,795, Non-Final Office Action dated Apr. 23, 2015, 9 pages.
U.S. Appl. No. 13/909,795, Notice of Allowance dated Sep. 18, 2015, 5 pages.
U.S. Appl. No. 14/618,791, Non-Final Office Action dated Sep. 4, 2015, 17 pages.
U.S. Appl. No. 13/841,994, Non-Final Office Action dated Oct. 26, 2015, 8 pages.
"Customizing Management Deployment Procedures" *Oracle® Enterprise Manager Lifecycle Administrator's Guide E27046-33*, pp. 51-1 to 51-19 (Jun. 2015).
U.S. Appl. No. 13/836,625, Non-Final Office Action dated Nov. 18, 2016, 41 pages.
U.S. Appl. No. 13/907,728, Notice of Allowance dated Aug. 25, 2016, 13 pages.
U.S. Appl. No. 13/907,616, Notice of Allowance dated Nov. 14, 2016, 10 pages.
U.S. Appl. No. 13/907,652, Final Office Action dated Sep. 13, 2016, 14 pages.
U.S. Appl. No. 14/664,528, Non Final Office Action dated Nov. 3, 2016, 18 pages.
U.S. Appl. No. 13/841,994, Notice of Allowance dated Dec. 5, 2016, 5 pages.
U.S. Appl. No. 14/877,835, Notice of Allowance dated Jan. 10, 2017, 13 pages.
International Application No. PCT/US2015/016214, International Preliminary Report on Patentability dated Sep. 19, 2016, 6 pages.
European Patent Application EP13766777.0, Examiner Report dated Nov. 30, 2016, 5 pages.
"World of Warcraft: Catacylsm Can Run When It Is Partially", downloaded from URL:https://zhidao.baidu.com/question/315386072. html, (Sep. 3, 2011) 1 page.
China Patent Application No. CN201380046472.4, Office Action dated Feb. 20, 2017, 25 pages.
U.S. Appl. No. 13/907,652, Notice of Allowance dated Jan. 25, 2017, 7 pages.
U.S. Appl. No. 13/843,613, Notice of Allowance dated Jun. 9, 2017, 9 pages.
U.S. Appl. No. 15/445,617, Non-Final Office Action dated Jul. 28, 2017, 13 pages.
U.S. Appl. No. 15/495,749, Non-Final Office Action dated Sep. 25, 2017, 7 pages.
Fukuda, Optimum Solution to Development of Smartphone App / Speedup with Basic Development Environment, Nikkei Computer, Nikkei Business Publications, Inc., No. 814, Aug. 2, 2012, pp. 42-47.
U.S. Appl. No. 14/664,528, Notice of Allowance dated May 17, 2017, 10 pages.
U.S. Appl. No. 13/836,625, Notice of Allowance dated Jul. 6, 2017, 12 pages.
China Patent Application No. CN201380054681.3, Office Action, dated Mar. 31, 2017, 38 pages.
China Patent Application No. CN201380054825.5, Office Action, dated Apr. 12, 2017, 19 pages.
U.S. Appl. No. 14/833,985, Notice of Allowance dated Sep. 13, 2018, 6 pages.
U.S. Appl. No. 15/246,352, Notice of Allowance dated Jul. 25, 2018, 22 pages.
U.S. Appl. No. 15/445,617, Notice of Allowance dated Sep. 24, 2018, 9 pages.

* cited by examiner

RULE BASED SUBSCRIPTION CLONING

CROSS-REFERENCES TO RELATED APPLICATIONS

The present application is related to the following applications, the entire contents of which are incorporated herein by reference for all purposes:
(1) U.S. Provisional Application No. 61/698,413, filed Sep. 7, 2012, entitled "Tenant Automation System;"
(2) U.S. Provisional Application No. 61/698,459, filed Sep. 7, 2012, entitled "Service Development Infrastructure;"
(3) U.S. Provisional Application No. 61/785,299, filed Mar. 14, 2013, entitled "Cloud Infrastructure;"
(4) U.S. Provisional Application No. 61/794,427, filed Mar. 15, 2013, entitled "Cloud Infrastructure;" and
(5) U.S. Provisional Application No. 61/799,461, filed Mar. 15, 2013, entitled "Service Association Model."

The present application hereby incorporates by reference in its entirety for all purposes U.S. Provisional Application No. 61/698,463, filed Sep. 7, 2012, entitled "Shared Identity Management Architecture."

The present application claims priority and benefit from U.S. Provisional Application No. 62/011,400, filed Jun. 12, 2014, entitled "RULE BASED SUBSCRIPTION CLONING."

The entire contents of the above-identified non-provisional and provisional patent applications are incorporated herein by reference for all purposes.

BACKGROUND

The present disclosure relates to computer systems and software, and more particularly to techniques for facilitating and automating the provision of services in a cloud environment.

Cloud computing is a model for enabling convenient, on-demand network access to a shared pool of configurable computing resources (e.g., networks, servers, storage, applications, and services). The services provided or accessed through the cloud (or network) are referred to as cloud services. There is a lot of processing that needs to be performed by a cloud service provider to make cloud services available to a subscribing customer. Due to its complexity, much of this processing is still done manually. For example, provisioning resources for providing such cloud services can be a very labor intensive process.

Consumers and businesses have an expectation that ordering and starting the use of computer network cloud-based services be seamless. However, many cloud services are difficult to start up, requiring the provisioning of resources that might be shared. For example, servers in a server farm may run cloud services for many customers at once, and adding another customer may require shifting around resources. Different users may wish to employ different services. For example, some users may only want raw storage on the cloud, while other users may want to use sophisticated database storage. Still others may want the use of graphical user interface (GUI) software applications running on the cloud for its employees or customers.

In some instances, businesses want to try out new features or components using an existing computing environment (e.g., a production system). However, these businesses may be unable to use an existing computing environment to implement a separate environment to test new features. This may cause some businesses to expend resources to implement a separate environment that requires additional configuration and computing resources. Additionally, implementation of an additional environment may involve administrative procedures to establish an agreement with a service provider for more computing resources. Creating additional computing environments may be cost prohibitive and time consuming for some businesses to implement an additional environment.

There exists a need in the art for faster, less expensive, and easier-to-use cloud based computer systems.

SUMMARY

Generally, aspects of the present disclosure relate to techniques for providing a user with access to a service provided by a cloud infrastructure system based on an existing service (e.g., cloning the existing service). Examples of types of services include, without limitation, Software as a Service (SaaS) category, Platform as a Service (PaaS) category, Infrastructure as a Service (IaaS) category, or other categories of services including hybrid services. The cloud infrastructure system may provide the user with a service by creating a subscription (e.g., a "clone subscription") based on an existing subscription (e.g., a base subscription) to an existing service provided by the cloud infrastructure system. The clone subscription provides the user with access to a service based on the existing service. Multiple clone subscriptions may be created based on a base subscription, where each clone subscription provides a subscription to a service that is based on the existing service of the base subscription.

In at least one illustrative example, access to a service provided by a clone subscription may be provided to support an additional environment for one type of use. The type of use supported by the additional environment may be different from a type of use corresponding to the existing subscription from which a clone subscription was established. For example, a user may request a clone subscription of a production environment provided by a base subscription to establish a testing environment that is based on (e.g., a clone of) the production environment. The testing environment for the clone subscription may be requested so that a new feature can be tested in the clone environment before deploying the new feature to its production environment.

A clone subscription may be associated with the subscription from which the clone subscription was created. When a clone subscription is associated with a subscription from which the clone subscription was created, the life cycle of the subscription and the clone subscription may be associated with each other. For example, access to a service provide by the clone subscription may terminate when the base subscription terminates if the clone subscription and the base subscription are associated with each other. In another example, when a term of the base subscription changes, the clone subscription may change to the same term if the clone subscription is associated with the base subscription.

In some embodiments, when a clone subscription is associated with a base subscription, changes made to a base subscription may be applied to an associated clone subscription(s). The changes may be applied based on one or more rules. The rules may be pre-defined. The pre-defined rules may be modified or new ("customer-defined") rules may be created. For example, one rule may indicate that a change to disable a component in the base subscription may be applied to the clone subscription such that the same component is disabled for the clone subscription.

A configuration of a service provided by a clone subscription may be adjusted independently of the service provided by the base subscription. Examples of adjustments to a configuration of a clone subscription may include an adjustment to a user count for the number of users that can access a service using the clone subscription, an adjustment to components enabled/disabled for the service, and/or an adjustment to a term of the clone subscription.

At least one embodiment, techniques are disclosed for providing a user with access a service provided by a cloud infrastructure system based on an existing service (e.g., cloning the existing service). One technique is a method that can be implemented by a computing system. The computing system can be included in a service infrastructure system. The service infrastructure system may be implemented by a cloud infrastructure system. The service infrastructure system may include a multi-tenant environment. The method may include providing multiple services in a service infrastructure system. The services may include a Java® service, a customer relationship management (CRM) service, or a human capital management (HCM) service. The method may include enabling a user (e.g., a customer) to access a first service in the multiple services. In some embodiments, enabling access to the first service may include providing a subscription to enable the customer to access the first service. The method may include receiving a request by the customer to access a second service as a clone of the first service. The method may include establishing the second service as a clone based on the first service. The method may include associating the first service with the second service based on a set of rules. The method may include managing access to the second service based on the set of rules in response to a change to the first service.

In some embodiments, associating the first service with the second service may include associating a life cycle of the first service with a life cycle of the second service. For example, access to the second service by the customer may be terminated when access to the first service by the customer is terminated. The set of rules may be used to determine an association between the life cycle of the first service and the life cycle of the second service. The method may further include updating access to the first service based on a request from the customer and modifying access to the second service based on the access updated to the first service.

In some embodiments, all or some of the set of rules may be received from a customer. For example, the set of rules may include at least one customer level rule. The method may further comprise receiving, from a computing device associated with the customer, data indicating at least one rule in the set of rules.

In some embodiments, the set of rules includes a rule determined based on a subscription to access the first service. The set of rules may indicate use of the second service as a clone of the first service. The second service may be established based on the set of rules.

In some embodiments, the set of rules may indicate access to the second service that is different from access to the first service. For example, the set of rules may indicate a duration of access to the second service. In another example, the set of rules may indicate a count of users permitted to access the second service, where the count of users permitted to access the second service is different from a count of users permitted to access the first service. In yet another example, the set of rules may indicate a configuration of the second service, where the configuration of the second service is different from a configuration of the first service.

In some embodiments, managing access to the second service based on the set of rules in response the change to the first service includes determining a class of procedure and an action associated with the class of procedure to be performed to the second service based on one or more metrics of the first service and based on an operation performed on the first service in response to the change to the first service, and performing the action on the second service.

Yet other embodiments relate to systems and machine-readable tangible storage media that employ or store instructions and/or code to perform operations to implement the techniques described herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The following detailed description together with the accompanying drawings will provide a better understanding of the nature and advantages of the present invention.

BRIEF DESCRIPTION OF THE DRAWINGS

Illustrative embodiments of the present invention are described in detail below with reference to the following drawing figures.

DETAILED DESCRIPTION

Figure 1A:
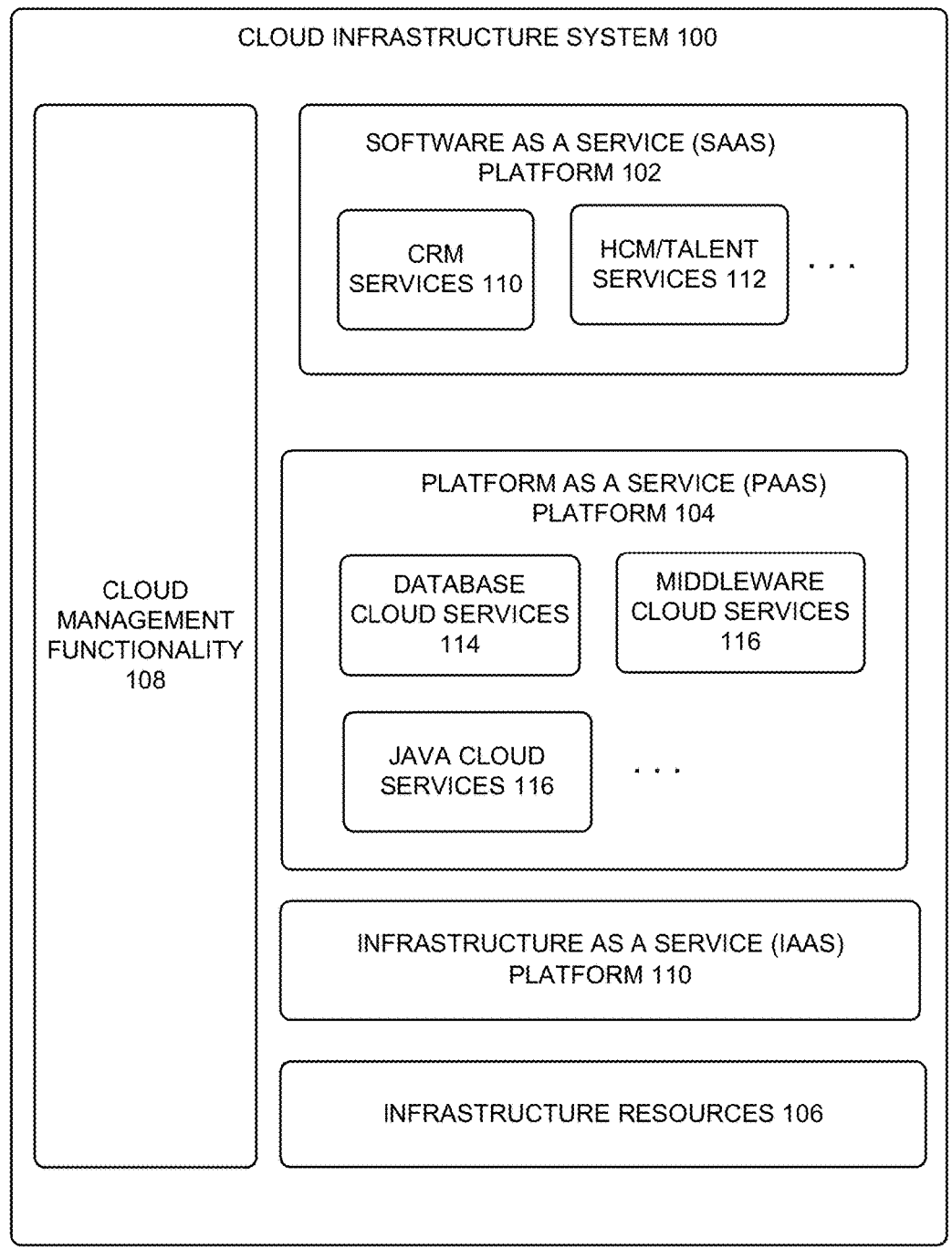
FIG. 1A is a logical view of a cloud infrastructure system according to one embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain embodiments of the present invention provide techniques for automating the provisioning, managing and tracking of services provided by a cloud infrastructure system.

Introduction

In certain embodiments, a cloud infrastructure system may include a suite of applications, middleware and database service offerings that are delivered to a customer in a self-service, subscription-based, elastically scalable, reliable, highly available, and secure manner. An example of such a cloud infrastructure system is the Oracle Public Cloud provided by the present assignee.

A cloud infrastructure system may provide many capabilities including, but not limited to, provisioning, managing and tracking a customer's subscription for services and resources in the cloud infrastructure system, providing predictable operating expenses to customers utilizing the services in the cloud infrastructure system, providing robust identity domain separation and protection of a customer's data in the cloud infrastructure system, providing customers with a transparent architecture and control of the design of the cloud infrastructure system, providing customers assured data protection and compliance with data privacy standards and regulations, providing customers with an integrated development experience for building and deploying services in the cloud infrastructure system and providing customers with a seamless integration between business software, middleware, database and infrastructure services in the cloud infrastructure system.

In certain embodiments, services provided by the cloud infrastructure system may include a host of services that are made available to users of the cloud infrastructure system on demand such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1A is a logical view of a cloud infrastructure system according to one embodiment of the present invention. Cloud infrastructure system 100 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 100. Cloud infrastructure system 100 then performs processing to provide the services in the customer's subscription order.

Cloud infrastructure system 100 may provide the cloud services via different deployment models. For example, services may be provided under a public cloud model where cloud infrastructure system 100 is owned by an organization selling cloud services (e.g., owned by Oracle) and the services are made available to the general public or different industry enterprises. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1A, cloud infrastructure system 100 may comprise multiple components, which working in conjunction, enable provision of services provided by cloud infrastructure system 100. In the embodiment illustrated in FIG. 1A, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 is configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, customers can utilize applications executing on cloud infrastructure system 100. Customers can acquire the application services without the need for customers to purchase separate licenses and support.

Various different SaaS services may be provided. Examples include without limitation services that provide solutions for sales performance management, enterprise integration and business flexibility for large organizations, and the like. In one embodiment, the SaaS services may include Customer Relationship Management (CRM) services 110 (e.g., Fusion CRM services provided by the Oracle cloud), Human Capital Management (HCM)/Talent Management services 112, and the like. CRM services 110 may include services directed to reporting and management of a sales activity cycle to a customer, and others. HCM/Talent services 112 may include services directed to providing global workforce life cycle management and talent management services to a customer.

Various different PaaS services may be provided by PaaS platform 104 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Customers can acquire the PaaS services provided by cloud infrastructure system 100 without the need for customers to purchase separate licenses and support. Examples of PaaS services include without limitation Oracle Java Cloud Service (JCS), Oracle Database Cloud Service (DBCS), and others.

By utilizing the services provided by PaaS platform 104, customers can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer customers a database-as-a-service in the form of a database cloud, middleware cloud services 116 provides a platform for customers to develop and deploy various business applications and Java cloud services 117 provides a platform for customers to deploy Java applications, in the cloud infrastructure system 100. The components in SaaS platform 102 and PaaS platform 104 illustrated in FIG. 1A are meant for illustrative purposes only and are not intended to limit the scope of embodiments of the present invention. In alternate embodiments, SaaS platform 102 and PaaS platform 104 may include additional components for providing additional services to the customers of cloud infrastructure system 100.

Various different IaaS services may be provided by IaaS platform 110. The IaaS services facilitate the management and control of the underlying computing resources such as storage, networks, and other fundamental computing resources for customers utilizing services provided by the SaaS platform and the PaaS platform.

In certain embodiments, cloud infrastructure system 100 includes infrastructure resources 106 for providing the resources used to provide various services to customers of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing and tracking a customer's subscription received by the cloud infrastructure system 100, and the like.

Figure 1B:
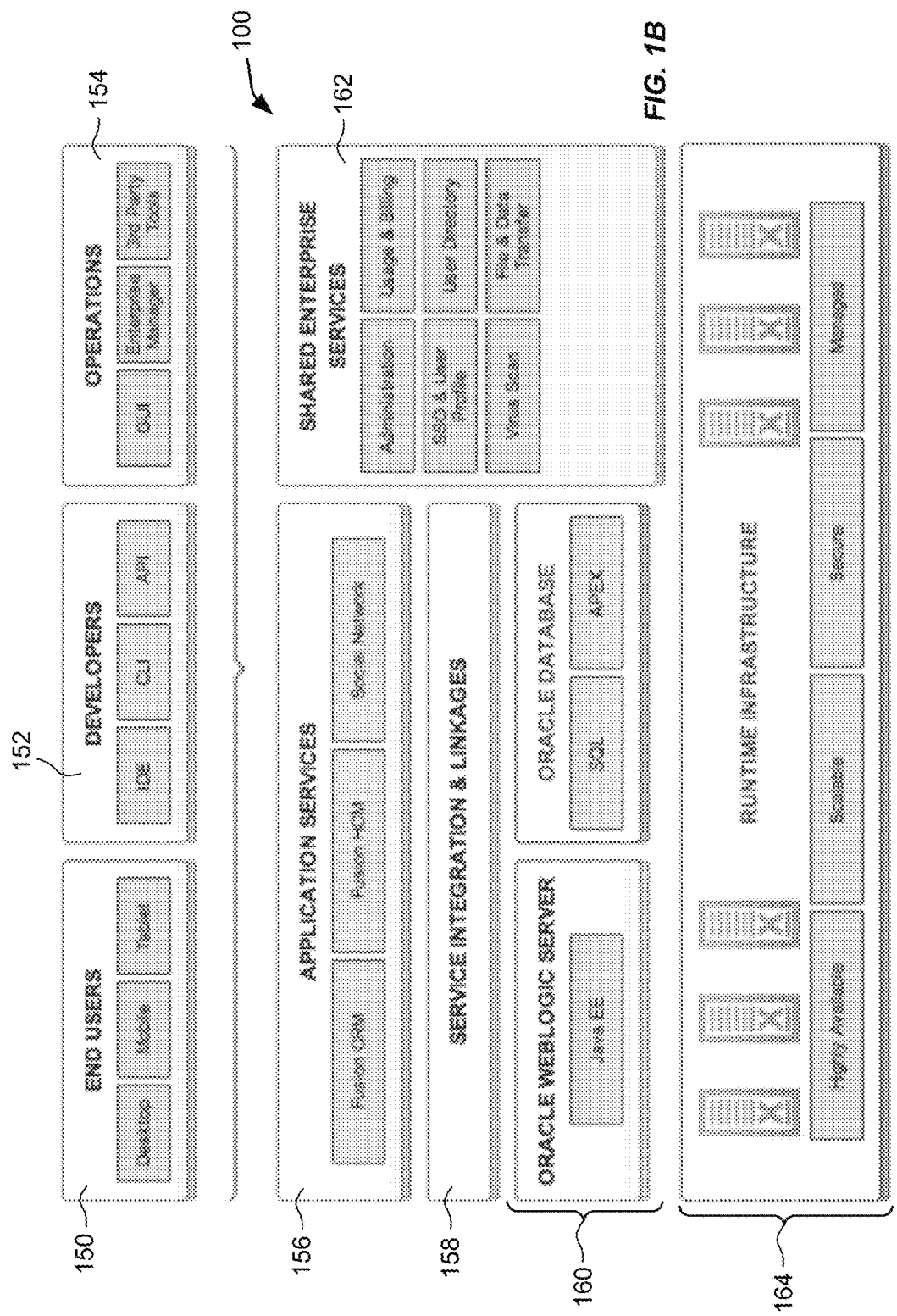
FIG. 1B is a simplified block diagram of a hardware/software stack that may be used to implement a cloud infrastructure system according to an embodiment of the present invention.

FIG. 1B is a simplified block diagram of a hardware/software stack that may be used to implement cloud infrastructure system 100 according to an embodiment of the present invention. It should be appreciated that implementation depicted in FIG. 1B may have other components than those depicted in FIG. 1B. Further, the embodiment shown in FIG. 1B is only one example of a cloud infrastructure system that may incorporate an embodiment of the invention. In some other embodiments, cloud infrastructure system 100 may have more or fewer components than shown in FIG. 1B, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In certain embodiments, runtime infrastructure layer 164 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

Figure 2:
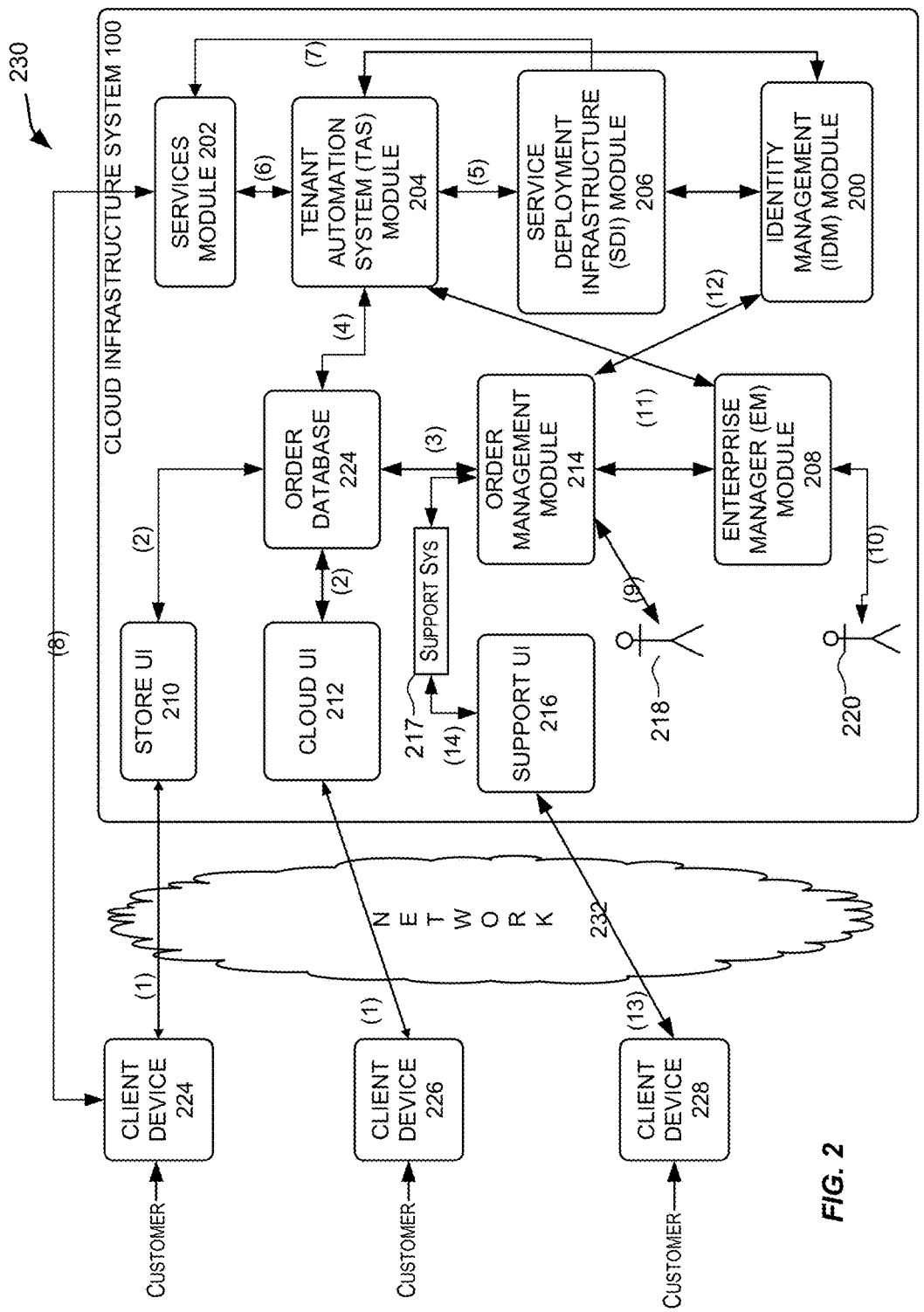
FIG. 2 is a simplified block diagram of a system environment for implementing the cloud infrastructure system shown in FIG. 1A.

FIG. 2 is a simplified block diagram of a system environment for implementing the cloud infrastructure system shown in FIG. 1A according to an embodiment of the present invention. In the illustrated embodiment, system environment 230 includes one or more client computing devices 224, 226 and 228 that may be used by users to interact with cloud infrastructure system 100. A client device may be configured to operate a client application such as a web browser, a proprietary client application (e.g., Oracle Forms), or some other application, which may be used by a user of the client device to interact with cloud infrastructure system 100 to utilize services provided by cloud infrastructure system 100.

It should be appreciated that cloud infrastructure system 100 depicted in FIG. 2 may have other components than those depicted in FIG. 2. Further, the embodiment shown in FIG. 2 is only one example of a cloud infrastructure system that may incorporate an embodiment of the invention. In some other embodiments, cloud infrastructure system 100 may have more or fewer components than shown in FIG. 2, may combine two or more components, or may have a different configuration or arrangement of components.

Client computing devices 224, 226 and 228 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, client computing devices 224, 226 and 228 may be any other electronic device, such as a thin-client computer, Internet-enabled gaming system, and/or personal messaging device, capable of communicating over a network (e.g., network 232 described below). Although exemplary system environment 230 is shown with three client computing devices, any number of client computing devices may be supported. Other devices such as devices with sensors, etc. may interact with cloud infrastructure system 100.

A network 232 may facilitate communications and exchange of data between clients 224, 226 and 228 and cloud infrastructure system 100. Network 232 may be any type of network familiar to those skilled in the art that can support data communications using any of a variety of commercially-available protocols, including without limitation TCP/IP, SNA, IPX, AppleTalk, and the like. Merely by way of example, network 232 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

Cloud infrastructure system 100 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up cloud infrastructure system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 100 may be adapted to automatically provision, manage and track a customer's subscription to services offered by cloud infrastructure system 100. In one embodiment, as depicted in FIG. 2, the components in cloud infrastructure system 100 include an Identity Management (IDM) module 200, a services module 202, a Tenant Automation System (TAS) module 204, a Service Deployment Infrastructure (SDI) module 206, an Enterprise Manager (EM) module 208, one or more front-end web interfaces such as a store user interface (UI) 210, a cloud user interface (UI) 212, and a support user interface (UI) 216, an order management module 214, sales personnel 218, operator personnel 220 and an order database 224. These modules may include or be provided using one or more computers and/or servers which may be general purpose computers, specialized server computers, server farms, server clusters, or any other appropriate arrangement and/or combination. In one embodiment, one or more of these modules can be provided by cloud management functionality 108 or IaaS platform 110 in cloud infrastructure system 100. The various modules of the cloud infrastructure system 100 depicted in FIG. 2 are meant for illustrative purposes only and are not intended to limit the scope of embodiments of the present invention. Alternative embodiments may include more or fewer modules than those shown in FIG. 2.

In an exemplary operation, at (1) a customer using a client device such as client device 224 or 226 may interact with cloud infrastructure system 100 by browsing the various services provided by cloud infrastructure system 100 and placing an order for a subscription for one or more services offered by cloud infrastructure system 100. In certain embodiments, the customer may access store UI 210 or cloud UI 212 and place a subscription order via these user interfaces.

The order information received by cloud infrastructure system 100 in response to the customer placing an order may include information identifying the customer and one or more services offered by the cloud infrastructure system 100 that the customer intends to subscribe to. A single order may include orders for multiple services. For instance, a customer may login to cloud UI 212 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computing resources, data transfer facilities, and the like.

For example, a basic service level may provide a minimum level of storage, data transmission, or number of users, and higher service levels may include additional resources.

In addition, in some instances, the order information received by cloud infrastructure system 100 may include information indicative of a customer level, and the time period during which the service is desired. The customer level specifies the priority of the customer making the subscription request. In one example, the priority may be determined based on the quality of service that the cloud infrastructure system 100 guarantees or promises the customer as specified by a Service Level Agreement (SLA) agreed to between the customer and the provider of the cloud services. In one example, the different customer levels include a basic level, a silver level and a gold level. The time period for a service may specify the start date and time for the service and the time period for which the service is desired (e.g., a service end date and time may be specified).

In one embodiment, a customer may request a new subscription via store UI 210 or request for a trial subscription via cloud UI 212. In certain embodiments, store UI 210 may represent the service provider's eCommerce store front (e.g., www.oracle.com/store for Oracle Cloud services). Cloud UI 212 may represent a business interface for the service provider. Consumer can explore available services and sign up for interested services through cloud UI 212. Cloud UI 212 captures user input necessary for ordering trial subscriptions provided by cloud infrastructure system 100. Cloud UI 212 may also be used to view account features and configure the runtime environment located within cloud infrastructure system 100. In addition to placing an order for a new subscription, store UI 210 may also enable the customer to perform other subscription-related tasks such as changing the service level of a subscription, extending the term of the subscription, increasing the service level of a subscription, terminating an existing subscription, and the like.

After an order has been placed per (1), at (2), the order information that is received via either store UI 210 or cloud UI 212 is stored in order database 224, which can be one of several databases operated by cloud infrastructure system 100 and utilized in conjunction with other system elements. While order database 224 is shown logically as a single database in FIG. 2, in actual implementation, this may comprise one or more databases.

At (3), the order is forwarded to order management module 214. Order management module 214 is configured to perform billing and accounting functions related to the order such as verifying the order and upon verification, booking the order. In certain embodiments, order management module 214 may include a contract management module and an install base module. The contract management module may store contract information associated with the customer's subscription order such as the customer's service level agreement (SLA) with cloud infrastructure system 100. The install base module may include detailed descriptions of the services in the customer's subscription order. In addition to order information, the install base module may track installation details related to the services, product status and support service history related to the services. As a customer orders new services or upgrades existing ones, the install base module may automatically add new order information.

At (4), information regarding the order is communicated to TAS module 204. In one embodiment, TAS module 204 utilizes the order information to orchestrate the provisioning of services and resources for the order placed by the customer. At (5), TAS component 204 orchestrates the provisioning of resources to support the subscribed services using the services of SDI module 206. At (6) TAS module 204 provides information related to the provisioned order received from SDI module 206 to services module 202. In some embodiments, at (7), SDI module 206 may also use services provided by services module 202 to allocate and configure the resources needed to fulfill the customer's subscription order.

At (8), services module 202 sends a notification to the customers on client devices 224, 226 and 228 regarding the status of the order.

In certain embodiments, TAS module 204 functions as an orchestration component that manages business processes associated with each order and applies business logic to determine whether an order should proceed to provisioning. In one embodiment, upon receiving an order for a new subscription, TAS module 204 sends a request to SDI module 206 to allocate resources and configure those resources needed to fulfill the subscription order. SDI module 206 enables the allocation of resources for the services ordered by the customer. SDI module 206 provides a level of abstraction between the cloud services provided by cloud infrastructure system 100 and the physical implementation layer that is used to provision the resources for providing the requested services. TAS module 204 may thus be isolated from implementation details such as whether or not services and resources are actually provisioned on the fly or pre-provisioned and only allocated/assigned upon request.

In certain embodiments, a user may use store UI 210 to directly interact with order management module 214 to perform billing and accounting related functions such as verifying the order and upon verification, booking the order. In some embodiments, instead of a customer placing an order, at (9), the order may instead be placed by sales personnel 218 on behalf of the customer such as a customer's service representative or sales representative. Sales personnel 218 may directly interact with order management module 214 via a user interface (not shown in FIG. 2) provided by order management module 214 for placing orders or for providing quotes for the customer. This, for example, may be done for large customers where the order may be placed by the customer's sales representative through order management module 214. The sales representative may set up the subscription on behalf of the customer.

EM module 208 is configured to monitor activities related to managing and tracking a customer's subscription in cloud infrastructure system 100. EM module 208 collects usage statistics for the services in the subscription order such as the amount of storage used, the amount data transferred, the number of users, and the amount of system up time and system down time. At (10), a host operator personnel 220, who may be an employee of a provider of cloud infrastructure system 100, may interact with EM module 208 via an enterprise manager user interface (not shown in FIG. 2) to manage systems and resources on which services are provisioned within cloud infrastructure system 100.

Identity management (IDM) module 200 is configured to provide identity services such as access management and authorization services in cloud infrastructure system 100. In one embodiment, IDM module 200 controls information about customers who wish to utilize the services provided by cloud infrastructure system 100. Such information can include information that authenticates the identities of such customers and information that describes which actions those customers are authorized to perform relative to various system resources (e.g., files, directories, applications, communication ports, memory segments, etc.) IDM module 200 can also include the management of descriptive information about each customer and about how and by whom that descriptive information can be accessed and modified.

In one embodiment, information managed by the identity management module 200 can be partitioned to create separate identity domains. Information belonging to a particular identity domain can be isolated from all other identity domains. Also, an identity domain can be shared by multiple separate tenants. Each such tenant can be a customer subscribing to services in the cloud infrastructure system 100. In some embodiments, a customer can have one or many identity domains, and each identity domain may be associated with one or more subscriptions, each subscription having one or many services. For example, a single customer can represent a large entity and identity domains may be created for divisions/departments within this large entity. EM module 208 and IDM module 200 may in turn interact with order management module 214 at (11) and (12) respectively to manage and track the customer's subscriptions in cloud infrastructure system 100.

In one embodiment, at (13), support services may also be provided to the customer via a support UI 216. In one embodiment, support UI 216 enables support personnel to interact with order management module 214 via a support backend system to perform support services at (14). Support personnel in the cloud infrastructure system 100 as well as customers can submit bug reports and check the status of these reports via support UI 216.

Other interfaces, not shown in FIG. 2 may also be provided by cloud infrastructure system 100. For example, an identity domain administrator may use a user interface to IDM module 200 to configure domain and user identities. In addition, customers may log into a separate interface for each service they wish to utilize. In certain embodiments, a customer who wishes to subscribe to one or more services offered by cloud infrastructure system 100 may also be assigned various roles and responsibilities. In one embodiment, the different roles and responsibilities that may be assigned for a customer may include that of a buyer, an account administrator, a service administrator, an identity domain administrator or a user who utilizes the services and resources offered by cloud infrastructure system 100. The different roles and responsibilities are described more fully in FIG. 4 below.

Figure 3A:
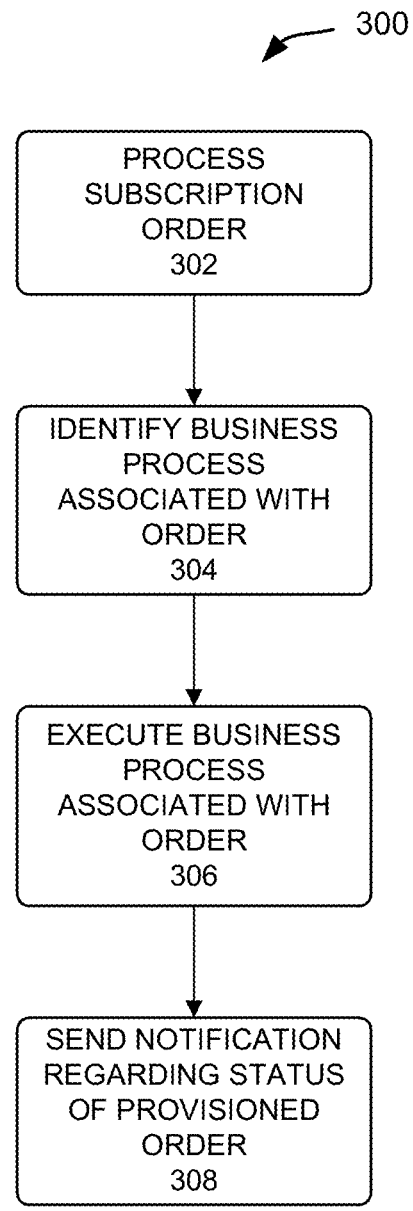
FIG. 3A depicts a simplified flowchart 300 depicting processing that may be performed by the TAS module in the cloud infrastructure system, in accordance with an embodiment of the present invention.

FIG. 3A depicts a simplified flowchart 300 depicting processing that may be performed by the TAS module in the cloud infrastructure system, in accordance with an embodiment of the present invention. The processing depicted in FIG. 3A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 3A is not intended to be limiting. Other sequences of steps may also be performed according to alternative embodiments. For example, alternative embodiments of the present invention may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 3A may be performed by one or more components in TAS component 204 as will be described in detail in FIG. 3B.

At 302, a customer's subscription order is processed. The processing may include validating the order, in one example. Validating the order includes ensuring that the customer has paid for the subscription and ensuring that the customer does not already have subscriptions with the same name or that the customer is not attempting to create multiple subscriptions of the same type in the same identity domain for subscription types for which this is disallowed (such as, in the case of a CRM service). Processing may also include tracking the status of an order for each order that is being processed by cloud infrastructure system 100.

At 304, a business process associated with the order is identified. In some instances, multiple business processes may be identified for an order. Each business process identifies a series of steps for processing various aspects of the order. As an example, a first business process may identify one or more steps related to provisioning physical resources for the order, a second business process may identify one or more steps related to creating an identity domain along with customer identities for the order, a third business process may identify one or more steps for related to performing back office functions such as creating a customer record for the user, performing accounting functions related to the order, and the like. In certain embodiments, different business processes may also be identified for processing different services in an order. For example, different business process may be identified to process a CRM service and a database service.

At 306, the business process identified for the order in 304 is executed. Executing the business process associated with the order may include orchestrating the series of steps associated with the business process identified in step 304. For example, executing a business process related to provisioning physical resources for the order may include sending a request to SDI module 206 to allocate resources and configure those resources needed to fulfill the subscription order.

At 308, a notification is sent to the customer regarding the status of the provisioned order. Additional description related to performing steps 302, 304, 306 and 308 is provided in detail in FIG. 3B.

Figure 3B:
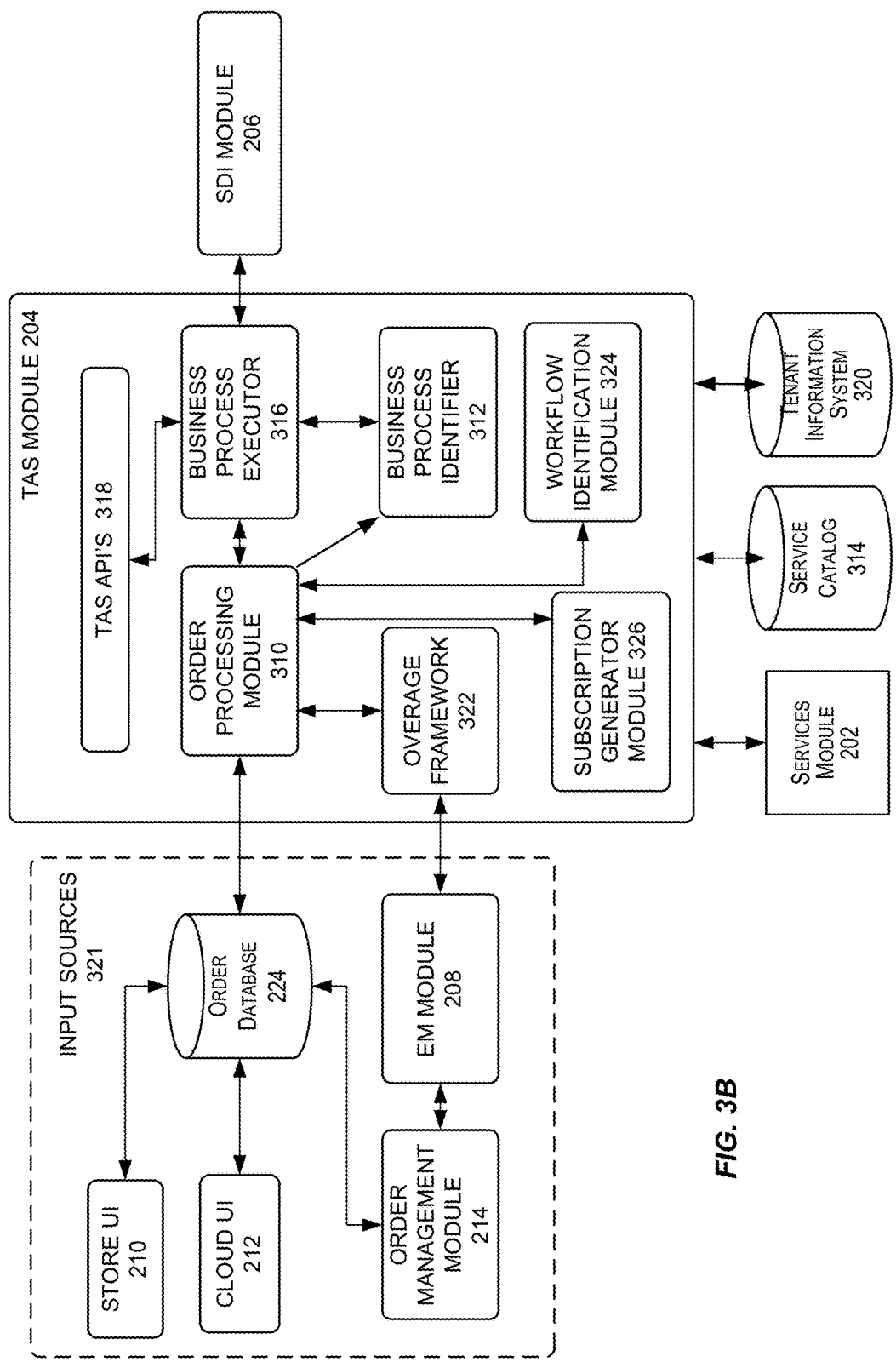
FIG. 3B depicts a simplified high level diagram of one or more sub-modules in the TAS module in the cloud infrastructure system, in accordance with an embodiment of the present invention.

FIG. 3B depicts a simplified high level diagram of one or more sub-modules in the TAS module in the cloud infrastructure system, in accordance with an embodiment of the present invention. In one embodiment, the modules depicted in FIG. 3B perform the processing described in steps 302-308 discussed in FIG. 3A. In the illustrated embodiment, TAS module 204 comprises an order processing module 310, a business process identifier 312, a business process executor 316, an overage framework 322, a workflow identification module 324, and a bundled subscription generator module 326. These modules may be implemented in hardware, or software, or combinations thereof. The various modules of the TAS module depicted in FIG. 3B are meant for illustrative purposes only and are not intended to limit the scope of embodiments of the present invention. Alternative embodiments may include more or fewer modules than those shown in FIG. 3B.

In one embodiment, order processing module 310 receives an order from a customer from one or more input sources 321. For example, order processing module 310 may directly receive an order via cloud UI 212 or store UI 210, in one embodiment. Alternatively, order processing module 310 may receive an order from order management module 214 or order database 224. Order processing module 310 then processes the order. In certain embodiments, processing the order includes generating a customer record which includes information about the order such as a service type, a service level, a customer level, the type of resources, the amount of the resources to be allocated to the service instance and a time period during which the service is desired. As part of the processing, order processing module 310 also determines whether the order is a valid order. This includes ensuring that the customer does not already have subscriptions with the same name or that the customer is not attempting to create multiple subscriptions of the same type in the same identity domain for subscription types where this is disallowed (such as, in the case of a fusion CRM service).

Order processing module 310 may also perform additional processing on the order. Processing may include tracking the status of an order for each order that is being processed by cloud infrastructure system 100. In one embodiment, order processing module 310 may process each order to identify a number of states pertaining to the order. In one example, the different states of an order may be an initialized state, a provisioned state, an active state, an administration required state, an error state, and the like. An initialized state refers to the state of a new order; a provisioned state refers to the state of an order once the services and resources for the order have been provisioned. An order is in an active state when the order has been processed by TAS module 204 and a notification to that effect has been delivered to the customer. An order is in an administration required state when intervention by an administrator is needed to resolve the issue. The order is in an error state when the order cannot be processed. In addition to maintaining the order progress status, order processing module 310 also maintains detailed information about any failures encountered during process execution. In other embodiments, and as will be discussed in detail below, the additional processing performed by order processing module 310 may also include changing the service level for a service in the subscription, changing the services included in the subscription, extending the time period of the subscription, and canceling the subscription or specifying different service levels for different time periods in the subscription.

After an order has been processed by order processing module 310, business logic is applied to determine whether the order should proceed to provisioning. In one embodiment, as part of orchestrating the order, business process identifier 312 receives the processed order from order processing module 310 and applies business logic to identify a particular business process to use for the order being processed. In one embodiment, business process identifier 312 may utilize information stored in a service catalog 314 to determine the particular business process to be used for the order. In one embodiment, and as discussed in FIG. 3A, multiple business processes may be identified for an order and each business process identifies a series of steps for processing various aspects of the order. In another embodiment, and as discussed above, different business processes may be defined for different types of services, or combinations of services such as a CRM service or a database service. In one embodiment, service catalog 314 may store information mapping an order to a particular type of business process. Business process identifier 312 may use this information to identify a specific business process for the order being processed.

Once a business process has been identified, business process identifier 312 communicates the particular business process to be executed to business process executor 316. Business process executor 316 then executes steps of the identified business process by operating in conjunction with one or more modules in the cloud infrastructure system 100. In some embodiments, business process executor 316 acts as an orchestrator for performing the steps associated with a business process. For example, the business process executor may interact with order processing module 310 to execute steps in a business process that identifies workflows related to the order, determines the overage of services in the order or identifies service components related to the order.

In one example, business process executor 316 interacts with SDI module 206 to execute steps in a business process for allocating and provisioning resources for services requested in the subscription order. In this example, for each step in the business process, business process executor 316 may send a request to SDI component 206 to allocate resources and configure resources needed to fulfill the particular step. SDI component 206 is responsible for the actual allocation of the resources. Once all the steps of the business processes of an order have been executed, business process executor 316 may send a notification to the customer of the processed order by utilizing the services of services component 202. The notification may include sending an email notification to the customer with details of the processed order. The email notification may also include deployment information related to the order to enable the customer to access the subscribed services.

In certain embodiments, TAS module 204 may provide one or more TAS Application Programming Interfaces (APIs) 318 that enable TAS module 204 to interact with other modules in cloud infrastructure system 100 and for other modules to interact with TAS module 204. For example, the TAS APIs may include a system provisioning API that interacts with SDI module 206 via an asynchronous Simple Object Access Protocol (SOAP) based web services call to provision resources for the customer's subscription order. In one embodiment, TAS module 204 may also utilize the system provisioning API to accomplish system and service instance creation and deletion, switch a service instance to an increased service level, and associate service instances. An example of this is the association of a Java service instance to a fusion applications service instance to allow secure web service communications. The TAS APIs may also include a notification API that interacts with the services module 202 to notify the customer of a processed order. In certain embodiments, the TAS module 204 also periodically propagates subscription information, outages, and notifications (e.g. planned downtime) to services component 202.

In certain embodiments, TAS module 204 periodically receives usage statistics for each of the provisioned services such as the amount of storage used, the amount data transferred, the number of users, and the amount of system up time and system down time from EM module 208. Overage framework 322 utilizes the usage statistics to determine whether over use of a service has occurred, and if so, to determine how much to bill for the overage, and provides this information to order management module 214.

In certain embodiments, TAS module 204 includes an order workflow identification module 324 that is configured to identify one or more workflows associated with processing a customer's subscription order. In certain embodiments, TAS module 204 may include a subscription order generation framework 326 for generating subscription orders for a customer when the customer places a subscription order for one or more services offered by the cloud infrastructure system 100. In one embodiment, a subscription order includes one or more service components responsible for providing the services requested by a customer in the subscription order.

Additionally, TAS module 204 may also interact with one or more additional databases such as a Tenant Information System (TIS) database 320 to enable the provisioning of resources for one or more services subscribed by the customer while taking into consideration historical information, if any, available for the customer. TIS database 320 may include historical order information and historical usage information pertaining to orders subscribed by the customer.

TAS module 204 may be deployed using different deployment models. In certain embodiments, the deployment includes a central component that interfaces with one or more distributed components. The distributed components may, for example, be deployed as various data centers and accordingly may also be referred to as data center components. The central component includes capabilities to process orders and co-ordinate services in cloud infrastructure system 100, while the data center components provide capabilities for provisioning and operating the runtime system that provides the resources for the subscribed services.

Figure 4:
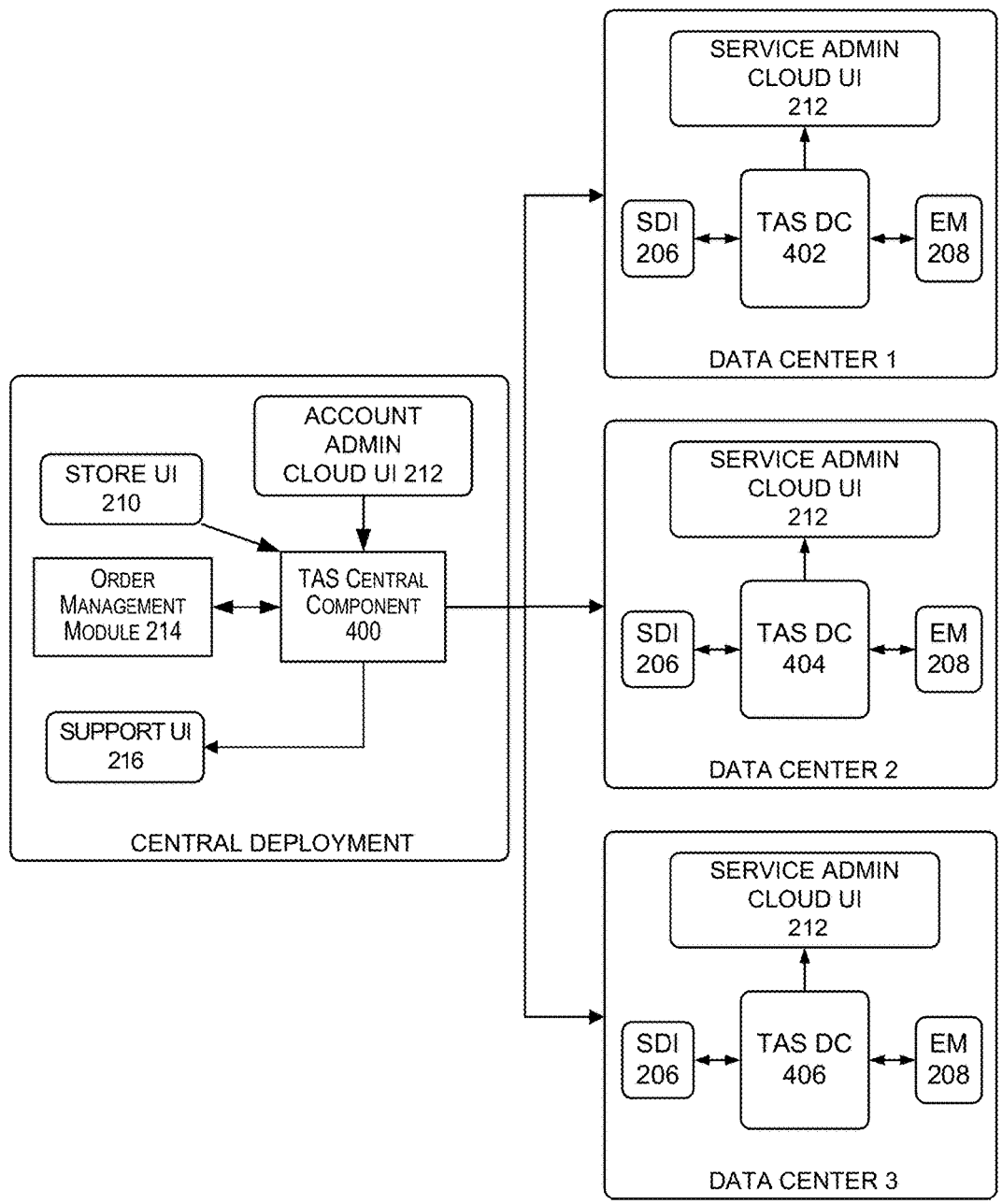
FIG. 4 depicts an exemplary distributed deployment of the TAS component, according to an embodiment of the present invention.

FIG. 4 depicts an exemplary distributed deployment of the TAS module, according to an embodiment of the present invention. In the embodiment depicted in FIG. 4, the distributed deployment of TAS module 204 includes a TAS central component 400 and one or more TAS Data Centers (DCs) components 402, 404 and 406. These components may be implemented in hardware, or software, or combinations thereof.

In one embodiment, the responsibilities of TAS central component 400 include, without limitation, to provide a centralized component for receiving customer orders, performing order-related business operations such as creating a new subscription, changing the service level for a service in the subscription, changing the services included in the subscription, and extending the time period of the subscription, or canceling the subscription. The responsibilities of TAS central component 400 may also include maintaining and serving subscription data needed by cloud infrastructure system 100 and interfacing with order management module 214, support UI 216, cloud UI 212 and store UI 210 to handle all the back-office interactions.

In one embodiment, the responsibilities of TAS DCs 402, 404 and 406 include, without limitation, performing runtime operations for orchestrating the provisioning the resources for one or more services subscribed by the customer. TAS DCs 402, 404 and 406 also include capabilities to perform operations such as locking, unlocking, enabling, or disabling a subscription order, collecting metrics related to the order, determining the status of the order, and sending notification events related to the order.

In an exemplary operation of the distributed TAS system shown in FIG. 4, TAS central component 400 initially receives an order from a customer via cloud UI 212, store UI 210, via order management system 214, or via order database 224. In one embodiment, the customer represents a buyer who has financial information and the authority to order and/or change a subscription. In one embodiment, the order information includes information identifying the customer, the type of services that the customer wishes to subscribe to, and an account administrator who will be responsible for handling the request. In certain embodiments, the account administrator may be nominated by the customer when the customer places an order for a subscription to one or more services offered by cloud infrastructure system 100. Based on the order information, the TAS central component 400 identifies the data region of the world such as Americas, EMEA, or Asia Pacific in which the order originates and the particular TAS DCs (for e.g., 402, 404 or 406) that will be deployed for provisioning the order. In one embodiment, the particular TAS DC (for e.g., from among DCs 402, 404 or 406) that will be deployed for provisioning the order is determined based on the geographical data region in which the request originated.

TAS central component 400 then sends the order request to the particular TAS DC in which to provision services for the order request. In one embodiment, TAS DCs 402, 404 or 406 identify a service administrator and an identity domain administrator responsible for processing the order request at the particular TAS DC. The service administrator and the identity administrator may be nominated by the account administrator identified in the subscription order. TAS DCs 402, 404 or 406 communicate with SDI module 204 to orchestrate the provisioning of physical resources for the order. SDI component 204 in respective TAS DCs 402, 404 or 406 allocates resources and configures those resources needed to fulfill the subscription order.

In certain embodiments, TAS DCs, 402, 404 or 406 identify an identity domain associated with the subscription. SDI component 206 may provide the identity domain information to IDM component 200 (shown in FIG. 2) for identifying an existing identity domain or creating a new identity domain. Once the order is provisioned by the SDI module at respective TAS DCs, 402, 404 or 406, TAS central component 400 may place information regarding the provisioned resources in a support system, via support UI 216. Information may include, for example, displaying resource metrics related to the services and usage statistics of the services.

Once in operation, at each data center, EM module 208 to periodically collects usage statistics for each of the provisioned services provisioned at that data center, such as the amount of storage used, the amount data transferred, the number of users, and the amount of system up time and system down time. These statistics are provided to the TAS DC that is local to EM module 208 (i.e., at the same data center). In an embodiment, the TAS DCs may use the usage statistics to determine whether overuse of a service has occurred, and if so, to determine how much to bill for the overage, and provide the billing information to order management system 214.

Figure 5:
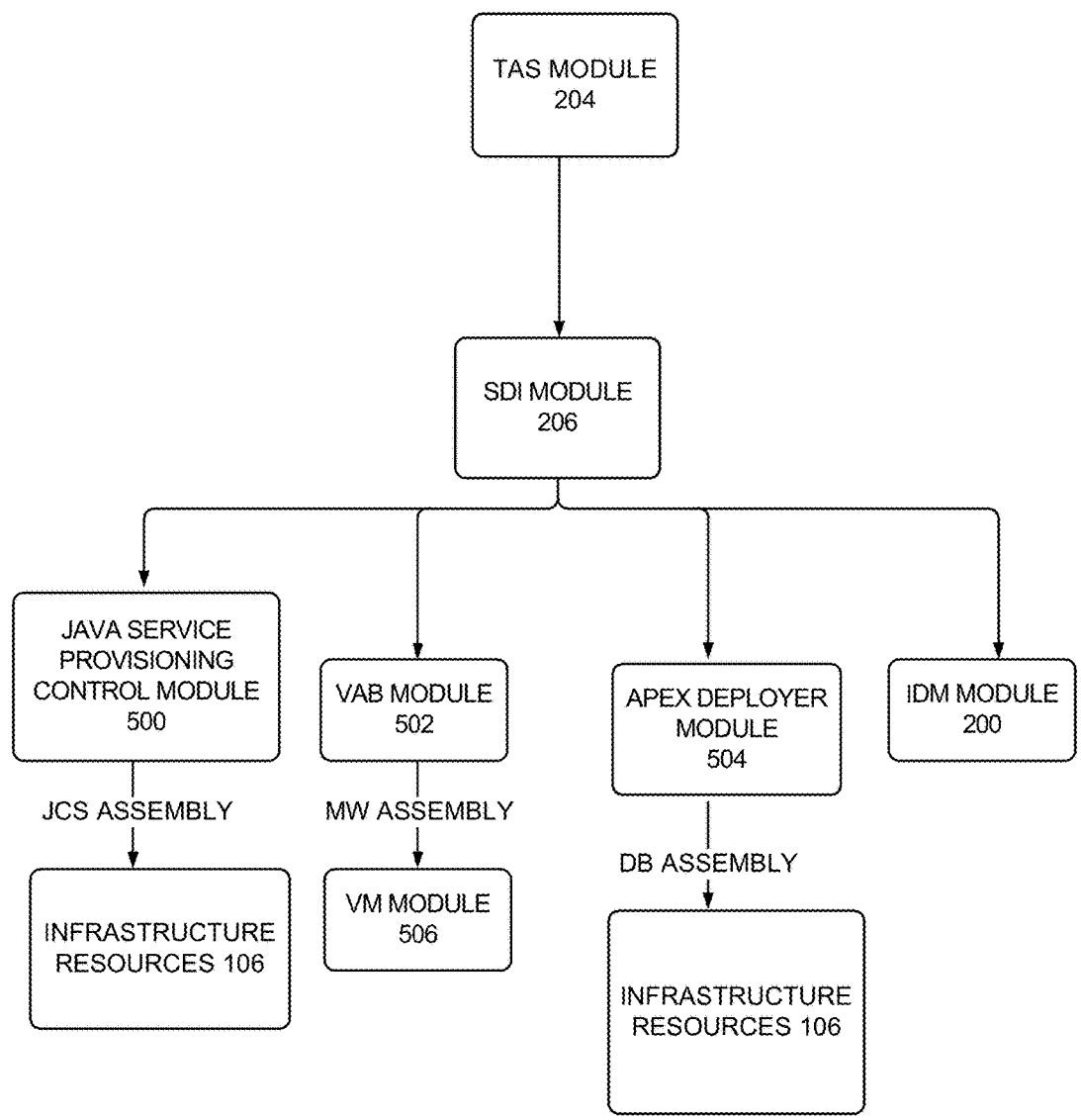
FIG. 5 is a simplified block diagram illustrating the interactions of the SDI module with one or more modules in the cloud infrastructure system, in accordance with an embodiment of the present invention.

FIG. 5 is a simplified block diagram illustrating the interactions of the SDI module with one or more modules in the cloud infrastructure system, in accordance with an embodiment of the present invention. In one embodiment, SDI module 206 interacts with TAS module 204 to provision resources for services in a subscription order received by TAS module 204. In certain embodiments, one or more of the modules illustrated in FIG. 5 may be modules within cloud infrastructure system 100. In other embodiments, one or more of the modules that interact with SDI module 206 may be outside cloud infrastructure system 100. In addition, alternative embodiments may have more or less modules than those shown in FIG. 5. These modules may be implemented in hardware, or software, or combinations thereof.

In one embodiment, the modules in SDI module 206 may include one or more modules in SaaS platform 102 and PaaS platform 104 in cloud infrastructure system 100. In order to perform provisioning of resources for various services, SDI module 206 may interact with various other modules, each customized to help with provisioning resources for a particular type of service. For example, as illustrated in FIG. 5, SDI module 206 may interact with a Java service provisioning control module 500 to provision Java cloud services. In one embodiment, Java service provisioning control component 500 may deploy a Java Cloud Service (JCS) assembly specified by SDI module 206 that includes a set of tasks to be performed to provision Java cloud services. Infrastructure resources 106 then determines the resources needed to provision the Java cloud services.

As other examples, SDI module 206 may interact with one or more modules such as a Virtual Assembly Builder (VAB) module 502, an Application Express (APEX) deployer module 504, a Virtual Machine (VM) module 506, an IDM module 200, and a database machine module 118. VAB module 502 includes capabilities to configure and provision complete multi-tier application environments. In one embodiment, VAB module 502 deploys a Middleware (MW) service assembly specified by SDI module 206 to provision a MW service in cloud infrastructure system 100 using the services provided by VM module 506. APEX deployer module 504 includes capabilities to configure and provision database services. In one embodiment, APEX deployer module 504 deploys a database service assembly specified by SDI module 206 to provision a database service in cloud infrastructure system 100 using the resources provided by infrastructure resources 106. SDI module 206 interacts with IDM module 200 to provide identity services such as access management across multiple applications in cloud infrastructure system 100.

Figure 6:
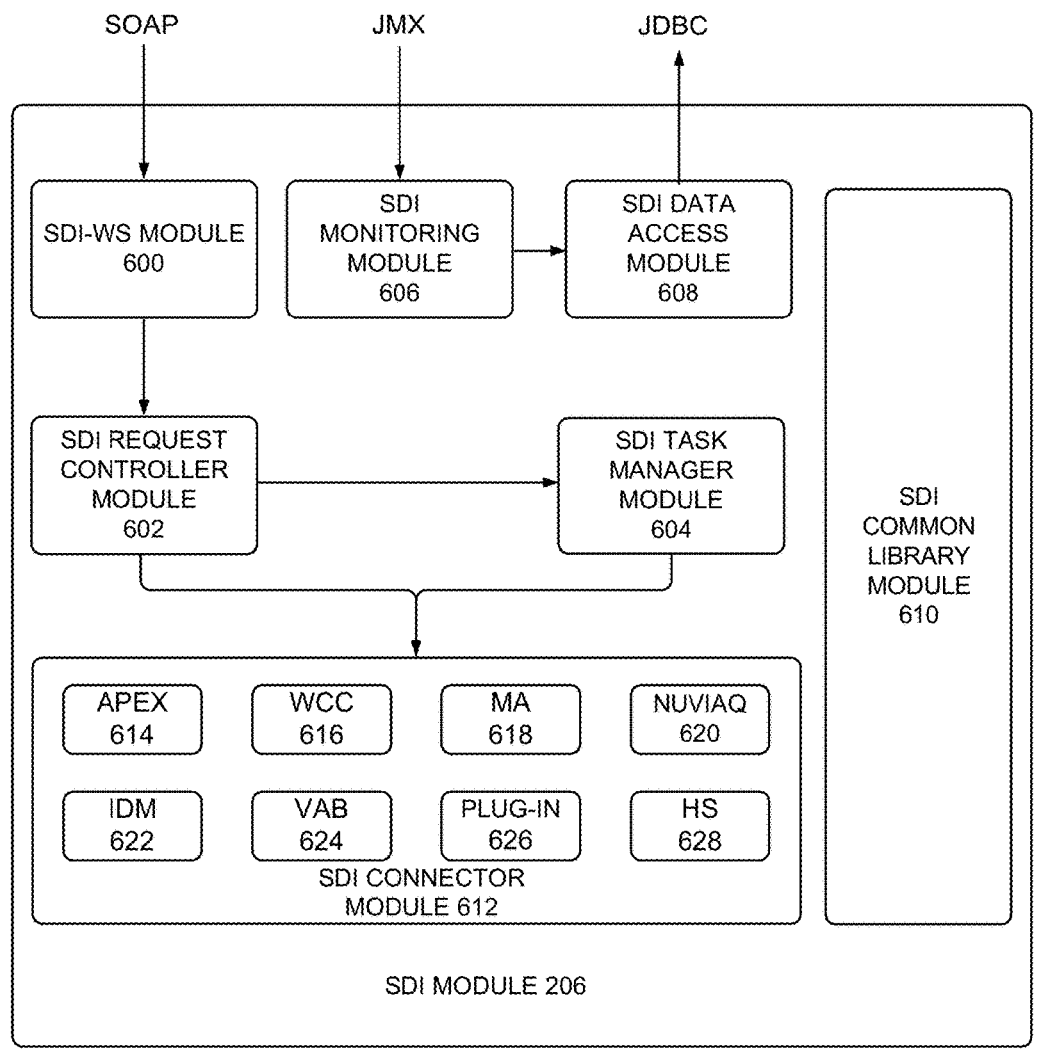
FIG. 6 depicts a simplified high level diagram of sub-modules of the SDI module according to an embodiment of the present invention.

FIG. 6 depicts a simplified high level diagram of sub-modules of the SDI module according to an embodiment of the present invention. In the embodiment depicted in FIG. 6, SDI module 206 includes a SDI-Web Services (WS) module 600, an SDI request controller module 602, an SDI task manager module 604, an SDI monitoring module 606, an SDI data access module 608, an SDI common library module 610, and an SDI connector module 612. These modules may be implemented in hardware, or software, or combinations thereof. SDI module 206 depicted in FIG. 6 and its various modules are meant for illustrative purposes only and are not intended to limit the scope of embodiments of the present invention. Alternative embodiments may have more or less modules than those shown in FIG. 6. These modules and their functions are described in detail below.

SDI-WS module 600 includes capabilities for receiving a step in the business associated with an order from business process executor 316 of TAS component 204. In one embodiment, SDI-WS module 600 parses each step of the business process and converts the step into an internal representation used by SDI module 206. In one embodiment, each step of the business process associated with the order arrives through a web service processing layer (for example, via System Provisioning API discussed in FIG. 3B) in the form of a SOAP request to SDI-WS module 600.

SDI request controller module 602 is the internal request processing engine in SDI module 206 and includes capabilities for performing asynchronous request processing, concurrent request processing, concurrent task processing, fault tolerant and recovery and plug-in support related to the order requests. In one embodiment, SDI request controller module 602 accepts each step of the business process associated with the order from SDI-WS module 600 and submits the step to SDI task manager module 604.

SDI task manager module 604 translates each step specified in the business process into a series of tasks for provisioning the particular step. Once the set of tasks for a specific step have been provisioned, SDI task manager module 604 responds to business process executor 316 in TAS module 204 with operation results that includes an order payload with details of the resources provisioned to fulfill the particular step. SDI task manager module 604 repeats this process until all the steps of the particular business process associated with the order are complete.

In certain embodiments, SDI task manager module 604 translates each step specified in the business process into a series of tasks by utilizing the services of SDI connector module 612. SDI connector module 612 includes one or more connectors for handling the deployment of tasks specified by SDI task manager module 604 to provision one or more services related to the order request. In certain embodiments, one or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, Application Express (APEX) connector 614 interfaces with APEX deployer module 504 to provision database services. Web Center Connector 616 (WCC) interfaces with a web center module in cloud infrastructure system 100 to provision web services. The web center module is a user engagement platform and includes capabilities for delivering connectivity between people and information in cloud infrastructure system 100.

In certain embodiments, Middleware Applications (MA) connector 618 interfaces with VAB module 502 in cloud infrastructure system 100 to provision middleware application services. NUVIAQ connector 620 interfaces with VAB module 502 to provision Java services. IDM connector 622 interfaces with IDM module 200 to provide identity and access management for users subscribing to services and resources in cloud infrastructure system 100. Virtual Assembly Builder (VAB) connector 624 interfaces with VAB module 502 in cloud infrastructure system 100 to configure and provision complete multi-tier application environments. Plug-in connector 626 interfaces with EM module 208 to manage and monitor the components in cloud infrastructure system 100. HTTP server connector 628 interfaces with one or more web servers in the PaaS platform to provide connection services to users in cloud infrastructure system 100.

SDI monitoring module 606 in SDI module 206 provides an inbound interface for receiving Java Management Extensions (JMX) requests. SDI monitoring module 606 also provides tools for managing and monitoring applications, system objects and devices in cloud infrastructure system 100. SDI-data access module 608 provides an inbound interface for receiving Java Database Connectivity (JDBC) requests. SDI-data access module 608 supports data access and provides object relational mapping, java transaction API services, data access objects, and connection pooling in cloud infrastructure system 100. The SDI-common library module 610 provides configuration support for the modules in SDI module 206.

Figure 7A:
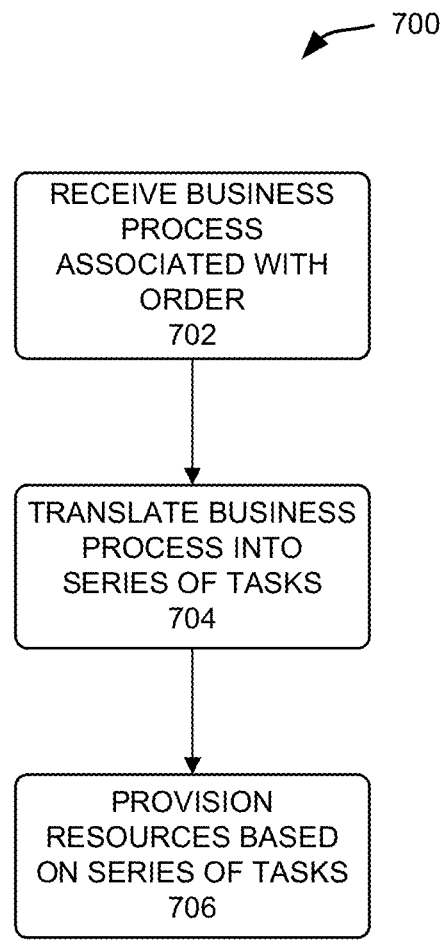
FIG. 7A depicts a simplified flowchart depicting processing that may be performed by the SDI component in the cloud infrastructure system, in accordance with an embodiment of the present invention.

The embodiment of FIG. 6 discussed above describes modules in the SDI module according to an embodiment of the present invention. FIG. 7A depicts a simplified flowchart 700 depicting processing that may be performed by the modules of the SDI module in the cloud infrastructure system, in accordance with an embodiment of the present invention. The processing depicted in FIG. 7A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 7A is not intended to be limiting. Other sequences of steps may also be performed according to alternative embodiments. For example, alternative embodiments of the present invention may perform the steps outlined above in a different order. Moreover, the individual steps illustrated in FIG. 7A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 7A may be performed by one or more modules in the SDI module 206 discussed in detail in FIG. 6.

At 702, a business process associated with a subscription order is received. In one embodiment, SDI-WS module 600 in SDI module 206 receives one or more steps in the business process associated with the subscription order from business process executor 316. At 704, each step in the business process is translated into a series of tasks for provisioning resources for the subscription order. In one embodiment, SDI task manager module 604 in SDI module 206 translates each step specified in the business process into a series of tasks by utilizing the services of SDI connector module 612. At 706, the subscription order is provisioned based on the series of tasks. In one embodiment, and as discussed in FIG. 6, SDI connector module 612 includes one or more connectors for handling the deployment of tasks specified by SDI task manager module 604 to provision resources for the services in the subscription order.

As described above with respect to FIG. 6, SDI task manager module 604 translates each step specified in a business process into a series of tasks by utilizing the services of SDI connector module 612, which may include one or more connectors for handling the deployment of tasks specified by SDI task manager module 604 to provision one or more services related to the order request. One or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, a NUVIAQ connector 620 interfaces with VAB module 502 to provision Java services.

Figure 7B:
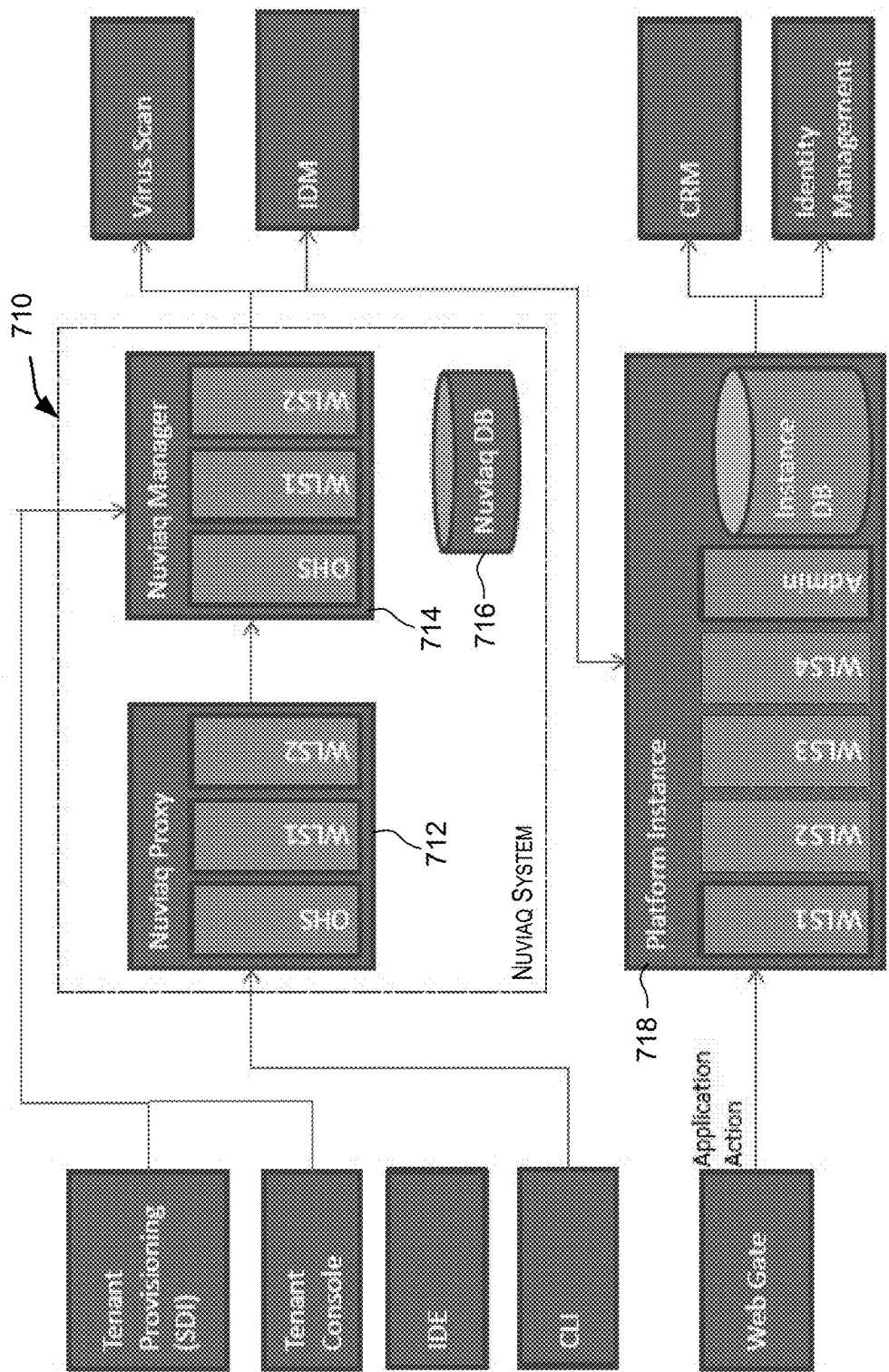
FIG. 7B depicts a simplified block diagram showing the high-level architecture of a Nuviaq system 710 and its relationships with other cloud infrastructure components according to an embodiment of the present invention.

FIG. 7B depicts a simplified block diagram showing the high-level architecture of a Nuviaq system 710 and its relationships with other cloud infrastructure components according to an embodiment of the present invention. It should be appreciated that Nuviaq system 710 depicted in FIG. 7B may have other components than those depicted in FIG. 7B. Further, the embodiment shown in FIG. 7B is only one example of a cloud infrastructure system that may incorporate an embodiment of the invention. In some other embodiments, Nuviaq system 710 may have more or fewer components than shown in FIG. 7B, may combine two or more components, or may have a different configuration or arrangement of components.

In certain embodiments, Nuviaq system 710 may be configured to provide a runtime engine for orchestrating PaaS operations. Nuviaq system 710 may provide a web service API to facilitate integration with other products and services. Nuviaq system 710 also provides support for complex workflows in system provisioning, application deployment and associated life cycle operations and integrates with management and monitoring solutions.

In the embodiment depicted in FIG. 7B, Nuviaq system 710 comprises a Nuviaq proxy 712, a Nuviaq manager 714, and a Nuviaq database 716. In certain embodiments, Nuviaq manager 714 provides an entry point into Nuviaq system 710, providing secure access to PaaS operations via the web service API. Internally, it tracks system state in the database and controls job execution on the workflow engine. In a public cloud, Nuviaq manager 714 may be accessed by the Tenant Provisioning system (SDI 206) and the Tenant Console, to drive provisioning and deployment operations respectively.

In one embodiment, Nuviaq manager 714 executes jobs asynchronously via an internal workflow engine. A job may be a sequence of actions specific to a given PaaS workflow. Actions may be performed in order, with failure in any step resulting in failure of the overall job. Many workflow actions delegate to external systems relevant to the workflow, such as the EM command line interface (cli). In one implementation, Nuviaq manager 714 application may be hosted in a 2-node WebLogic cluster with associated HTTP server (e.g., Oracle HTTP Server or OHS) instance, running inside a firewall.

In certain embodiments, Nuviaq proxy 712 is the public access point to the Nuviaq API. In one embodiment, only Public API may be exposed here. Requests received by proxy 712 may be forwarded to Nuviaq manager 714. In one embodiment, Nuviaq proxy 712 runs outside the firewall, whereas manager 714 runs within the firewall. In one implementation, Nuviaq proxy 712 application runs on a WebLogic cluster running outside the firewall.

In certain embodiments, Nuviaq database 716 tracks various domain entities such as, without limitation, platform instance, deployment plan, application, WebLogic domain, jobs, alerts, and the like. Primary keys may be aligned with the Service Database where appropriate.

In one embodiment, Platform Instance 718 may contain all resources required for a WebLogic service for a given tenant.

Nuviaq system 710 may rely on additional systems of cloud infrastructure system 100 to carry out the workflows used the WebLogic cloud service. These dependencies may include dependencies on SDI 206, IDM 200, a virus scan system, a service database, CRM instances, and the like. For example, Nuviaq system 710 may depend upon functions performed by an Assembly Deployer in SDI 206. In one embodiment, the Assembly Deployer is a system to manage interactions with OVAB (Oracle Virtual Assembly Builder) and OVM (Oracle Virtual Machine). Capabilities of the Assembly Deployer used by Nuviaq system 710 may include, without limitation, functions for deploying an assembly, un-deploying an assembly, describing assembly deployment, scaling appliance, and the like. In one implementation, Nuviaq system 710 accesses the Assembly Deployer via a web service API.

In certain embodiments, security policies may require certain artifacts to be scanned for viruses before being deployed to an application. Cloud infrastructure system 100 may provide a virus scan system for this purpose that provides scanning as a service for multiple components of the public cloud.

In certain embodiments, a public cloud infrastructure may maintain a Service Database containing information about tenants (e.g., customers) and their service subscriptions. Nuviaq workflows may access to this data in order to properly configure a WebLogic service as a client to other services that the tenant also subscribes to.

Nuviaq system 710 may depend on IDM 200 for its security integration. In certain embodiments, Java Service instances can be associated with a CRM instance. The association allows user applications deployed to their Java Service instance to access a CRM instance though Web Service calls.

Various entities may use services provided by Nuviaq system 710. These clients of Nuviaq system 710 may include: a Tenant Console, which is an management server (e.g., Oracle Management Server) based user interface that customers may access to manage their applications on their platform instances; several IDEs such as Oracle IDEs (JDeveloper, NetBeans, and OEPE) have been extended to offer access to application life cycle management operations; one or more Command Line Interfaces (CLIs) that are available to access life cycle operations on the platform instances.

Provisioning use case for Nuviaq system 710—A Provision Platform Instance use case is realized via the Create Platform Instance operation of the Nuviaq API. In the context of cloud infrastructure system 100, a service instance with respect to the Nuviaq system corresponds to a Nuviaq platform instance. A platform instance is assigned a unique identifier is used on all subsequent operations related to this instance. A Platform Deployment descriptor provided to the Create Platform Instance action allows for properties to be set that modify the configuration of the platform instance to meet the subscription requirements of the tenant. These properties may include for example:

Property#1: oracle.cloud.service.weblogic.size
  Values: BASIC, STANDARD, ENTERPRISE
  Description: Specifies the subscription type. This impacts the number of servers, database limits and quality of service settings.
Property#2: oracle.cloud.service.weblogic.trial
  Values: TRUE, FALSE
  Description: Indicates whether or not this is a trial subscription.
Property#3: oracle.cloud.service.weblogic.crm
  Values: CRM Service ID
  Description: Identifies a CRM service to be associated with this WebLogic service instance.

Figure 7C:
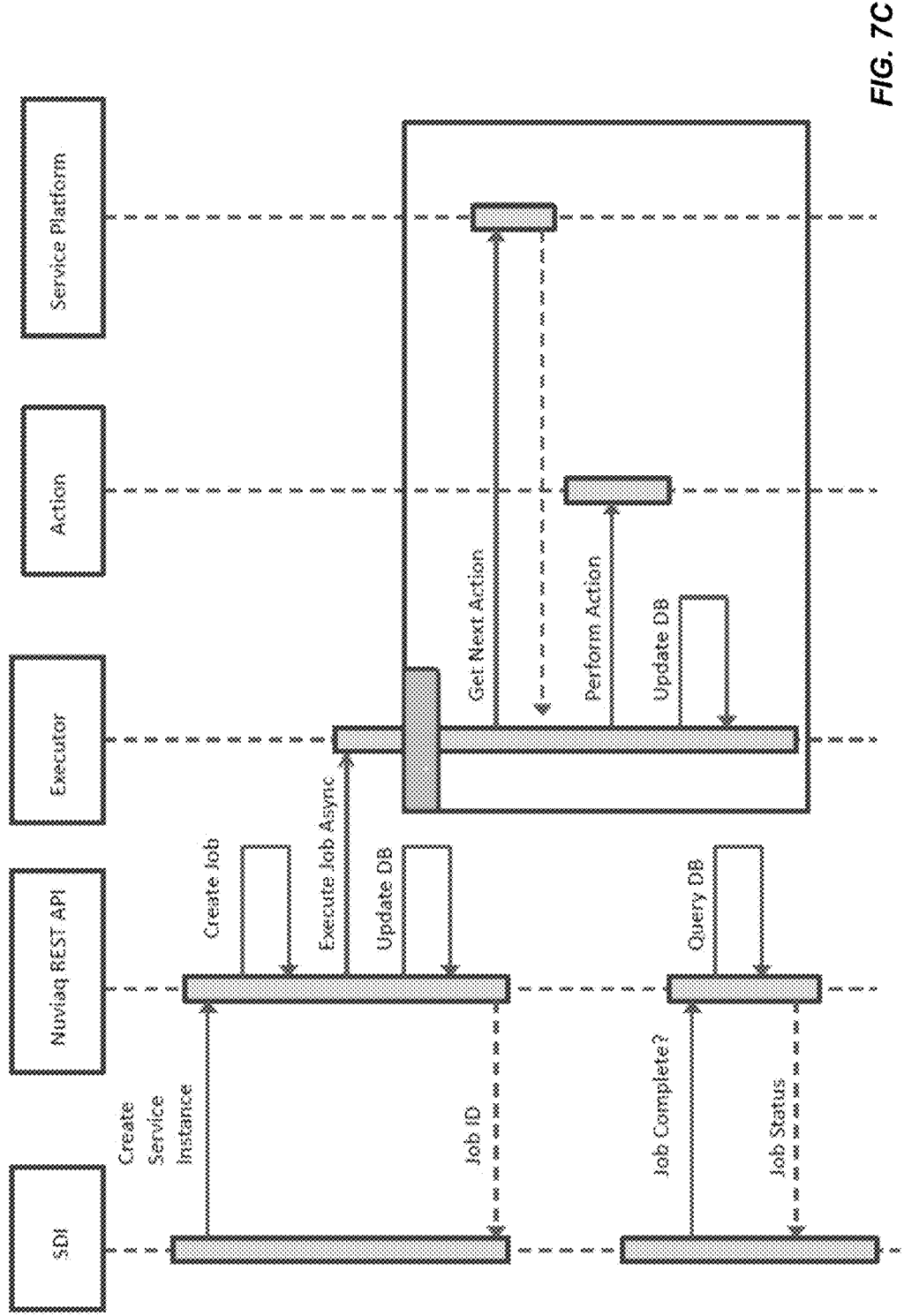
FIG. 7C depicts an example sequence diagram illustrating steps of a provisioning process using a Nuviaq system according to an embodiment of the present invention.

FIG. 7C depicts an example sequence diagram illustrating steps of a provisioning process using a Nuviaq system according to an embodiment of the present invention. The sequence diagram depicted in FIG. 7C is only an example and is not intended to be limiting.

Install/Update Application use case—The Install Application operation deploys an application to a running WebLogic Server after validating that the application archive meets the security requirements of the Public Cloud. In one embodiment, the Application Deployment descriptor provided to the Install Application action allows for properties to be set that modify the configuration of the application to meet the subscription requirements of the tenant. These properties may include for example:

Property: oracle.cloud.service.weblogic.state
Values: RUNNING, STOPPED
Description: Specifies the initial state of the application after deployment.

Figure 7D:
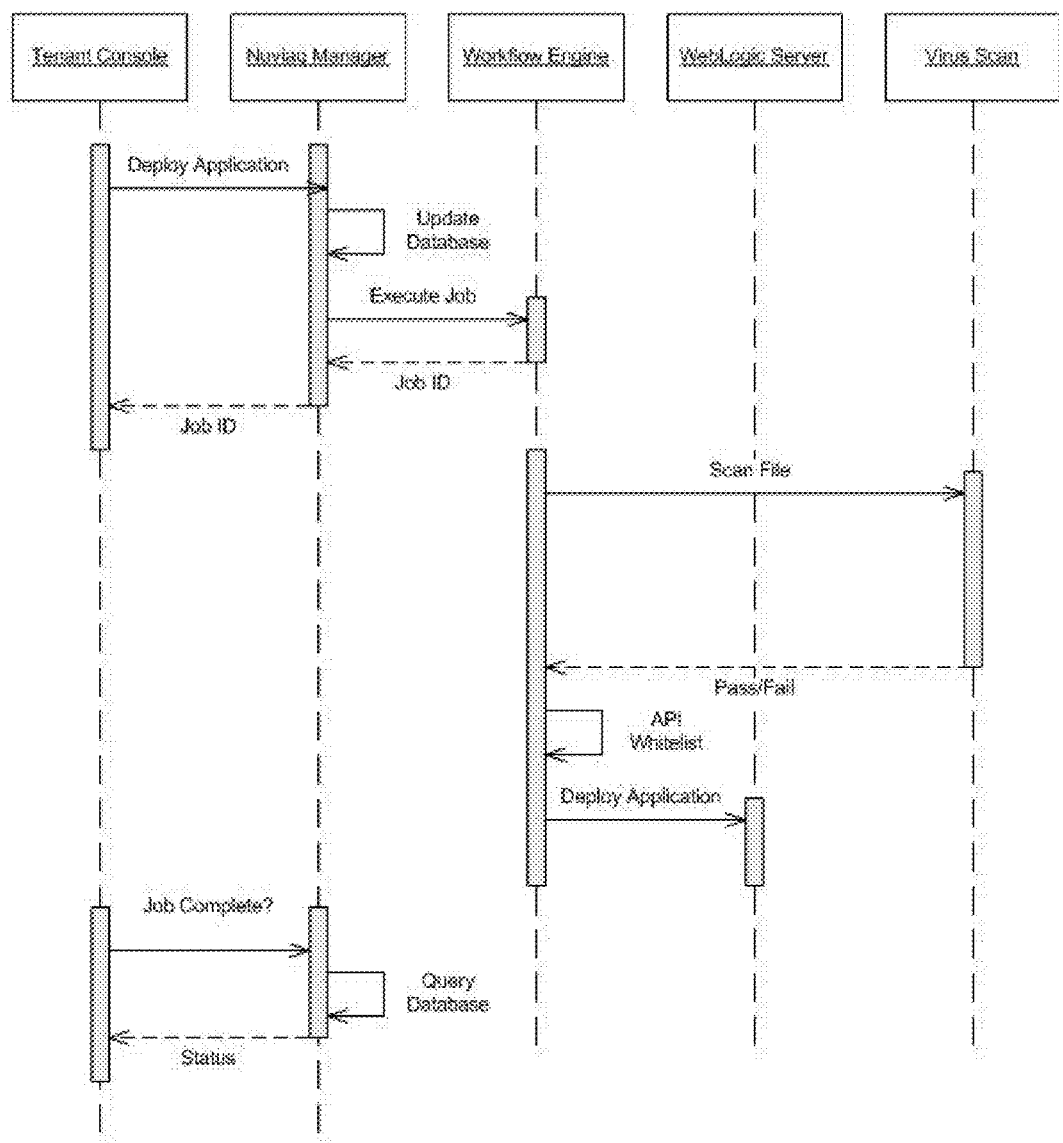
FIG. 7D depicts an example sequence diagram illustrating steps of a deployment process using a Nuviaq system according to an embodiment of the present invention.

FIG. 7D depicts an example sequence diagram illustrating steps of a deployment process using a Nuviaq system according to an embodiment of the present invention. The sequence diagram depicted in FIG. 7D is only an example and is not intended to be limiting.

Referring back to FIG. 2, in certain embodiments, TAS 204 and SDI 206 working in cooperation are responsible for provisioning resources for one or more services ordered by a customer from a set of services offered by cloud infrastructure system 100. For example, in one embodiment, for provisioning a database service, the automated provisioning flow may be as follows for a paid subscription:

(1) Customer places an order for a paid subscription to a service via Store UI 210.
(2) TAS 204 receives the subscription order.
(3) When services are available TAS 204 initiates provisioning by using the services of SDI 206. TAS 204 may perform business process orchestration, which will execute the relevant business process to complete the provisioning aspect of the order. In one embodiment, TAS 204 may use a BPEL (Business Process Execution Language) Process Manager to orchestrate the steps involved in the provisioning and handle the life cycle operations.
(4) In one embodiment, to provision a database service, SDI 206 may call PLSQL APIs in the CLOUD UI to associate a schema for the requesting customer.
(5) After successful association of a schema to the customer, SDI signals TAS and TAS send a notification to the customer that the database service is now available for use by the customer.
(6) The customer may log into cloud infrastructure system 100 (e.g., using an URAL such as cloud.oracle.com) and activate the service.

In some embodiments, a customer may also be allowed to subscribe to a service on a trial basis. For example, such a trial order may be received via cloud UI 212 (e.g., using cloud.oracle.com).

Figure 7E:
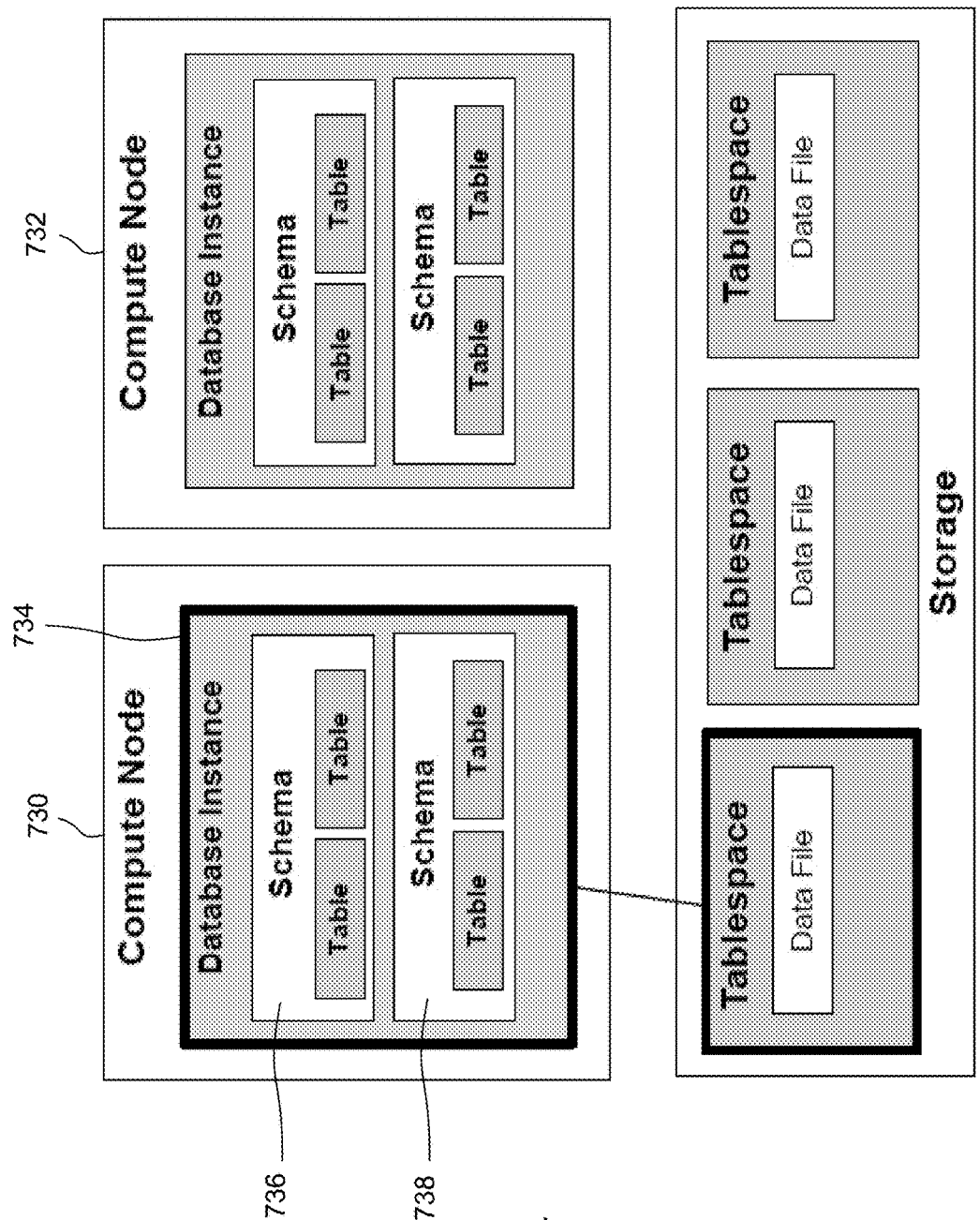
FIG. 7E depicts an example of database instances provisioned for a database service according to an embodiment of the present invention.

In certain embodiments, cloud infrastructure system 100 enables underlying hardware and service instances to be shared between customers or tenants. For example, the database service may be provisioned as shown in FIG. 7E in one embodiment. FIG. 7E depicts multiple Exadata compute nodes 730 and 732, each providing a database instance provisioned for the database service. For example, compute node 730 provides a database instance 734 for a database service. Each Exadata compute node may have multiple database instances.

In certain embodiments, each database instance can comprise multiple schemas and the schemas may be associated with different customers or tenants. For example, in FIG. 7E, database instance 734 provides two schemas 736 and 738, each with its own tables. Schema 736 may be associated with a first customer or tenant subscribing to a database service and schema 738 may be associated with a second customer or tenant subscribing to the database service. Each tenant gets a completely isolated schema. Each schema acts like a container that can manage database objects including tables, views, stored procedures, triggers, etc. for the associated tenant. Each schema may have one dedicated tablespace, with each tablespace having one data file.

In this manner, a single database instance can provide database services to multiple tenants. This not only enables sharing of underlying hardware resources but also enables sharing of service instance between tenants.

In certain embodiments, such a multi-tenancy system is facilitated by IDM 200, which beneficially enables multiple separate customers, each having their own separate identity domains, to use hardware and software that is shared in the cloud. Consequently, there is no need for each customer to have its own dedicated hardware or software resources, and in some cases resources that are not being used by some customers at a particular moment can be used by other customers, thereby preventing those resources from being wasted. For example, as depicted in FIG. 7E, a database instance can service multiple customers each with their respective identity domains. Although each such database service instance can be a separate abstraction or view of a single physical multi-tenant database system that is shared among the many separate identity domains, each such database service instance can have a separate and potentially different schema than each other database service instance has. Thus, the multi-tenant database system can store mappings between customer-specified database schemas and the identity domains to which those database schemas pertain. The multi-tenant database system can cause the database service instance for a particular identity domain to use the schema that is mapped to that particular identity domain.

The multi-tenancy can also be extended to other services such as the Java Service. For example, multiple customers can have a JAVA service instance placed within their respective identity domains. Each such identity domain can have a JAVA virtual machine, which can be viewed as being a virtual "slice" of hardware. In one embodiment, a job-monitoring service (e.g., Hudson) can be combined with a JAVA enterprise edition platform (e.g., Oracle WebLogic) in the cloud to enable each separate identity domain to have its own separate virtual "slice" of the JAVA enterprise edition platform. Such a job-monitoring service can, for example, monitor the execution of repeated jobs, such as building a software project or jobs run by an operating system's time-based job scheduler. Such repeated jobs can include the continuous building and/or testing of software projects. Additionally or alternatively, such repeated jobs can include the monitoring of executions of operating system-run jobs that are executed on machines that are remote from the machine on which the job-monitoring service executes.

Subscription Cloning

In certain embodiments, cloud infrastructure system 100 may enable additional instance provisioning. The additional instance provisioning may establish a service that provides an additional environment for use by a customer. Examples of types of services include, without limitation, Software as a Service (SaaS) category, Platform as a Service (PaaS) category, Infrastructure as a Service (IaaS) category, or other categories of services including hybrid services.

In one aspect, cloud infrastructure system 100 can provide a user with access to a service (e.g., a "clone service") based on an existing service (e.g., cloning the existing service). A service based on an existing service may be provided by creating a subscription (e.g., a "clone subscription") based on an existing subscription (e.g., a base subscription) for the existing service. The clone service may be used by the customer as an additional environment ("clone environment"). In another aspect, multiple clone subscriptions may be created based on a base subscription, where each clone subscription provides a subscription to a service that is based on the existing service of the base subscription. The service provided by the clone subscription may provide an additional computing environment for the customer that is separate from a computing environment provided by the base subscription.

A clone subscription can be designated or intended for a type of use which may be different from a type of use corresponding to the service provided by the base subscription. A customer may be afforded many benefits by having the ability to use a cloned environment for a purpose different than a purpose for using an environment associated with a base subscription. For example, a clone subscription may be used for testing, training customers/employees, demonstration to customers/employees, prototyping for customers/development, development, load balancing, whereas a base subscription may be used for other purposes, such as for production. The types of uses disclosed herein are described for purposes of illustration. The type of uses of a clone subscription and a base subscription can vary based on the needs of a customer.

In one example, a customer may request a clone subscription to implement a clone environment of its production environment to test or prototype a new feature in the clone environment before deploying the feature to the production environment. The ability to test or prototype a new feature in clone environment before release to production may enable a customer to test and stage implementation of a product. Prototyping may enable a customer to obtain feedback on proposed products/features by hosting them using an environment provided for a clone subscription without affecting an existing production environment implemented using a service provided by a base subscription. The features that are prototyped and tested in a clone environment may be different from a production environment because a customer may not desire to implement those features in a production environment until ready to do so.

In another example, a clone subscription can be used for load balancing purposes. Non-mission critical workflows can be offloaded to a clone environment and only mission critical workflows can be run on the production environment. This may reduce load on the production environment and hence improve performance of the mission critical workflows.

In another example, the environment provided by a clone subscription may enable the customer to perform tasks such as demonstrations and training, whereas the environment provided by a base subscription may be used as a production environment. For example, a clone subscription can be used to train internal employees (e.g., marketing and sales reps) or to demonstrate features of a product to customers. It may be desirable for such tasks to be performed in a different environment than a production environment which may be impacted by such use. As such, a clone environment provides a customer with an automatically configured additional environment to be used for a different purpose, without having to configure and implement a completely new environment from scratch.

The ability to create one or more clone subscriptions based on an existing subscription may enable customers to reduce costs associated with creating a similar, if not a duplicate environment. In some embodiments, the costs associated with obtaining a clone subscription may be far less than the costs for a base subscription. Because a clone subscription may be provisioned based on an existing service, the costs for implementing a clone service can be reduced. As such, a customer is afforded the benefit of reduced costs for a clone subscription. However, to account for a reduction in costs, features provided for a clone subscription may vary from a base subscription. For example, a level of recovery services (e.g., high availability and disaster recovery services) offered for a clone subscription to a customer may be different from services provided to that customer for a base subscription. In another example, replication latency for a clone subscription could be more than that for a base subscription.

A clone subscription may be associated with the base subscription from which the clone subscription was created. When a clone subscription is associated with a base subscription from which the clone subscription was created, the life cycle of the base subscription and the clone subscription may be associated with each other. In some embodiments, when a clone subscription is associated with a base subscription, changes made to a base subscription may be applied to an associated clone subscription(s). The changes may be applied based on one or more rules. Examples of managing a clone subscription are described below with reference to FIGS. 8A-8C and 9.

A configuration of a service provided by a clone subscription may be adjusted independently of the service provided by the base subscription. Examples of adjustments to a configuration of a clone subscription may include an adjustment to a user count for the number of users that can access a service using the clone subscription, an adjustment to components enabled/disabled for the service, and/or an adjustment to a term of the clone subscription. The changes in a clone configuration can be requested at the time of clone creation as well as later via operations on a configuration of a clone subscription. Example of changes to clone configurations is described with reference to FIGS. 8C and 10.

Figure 8A:
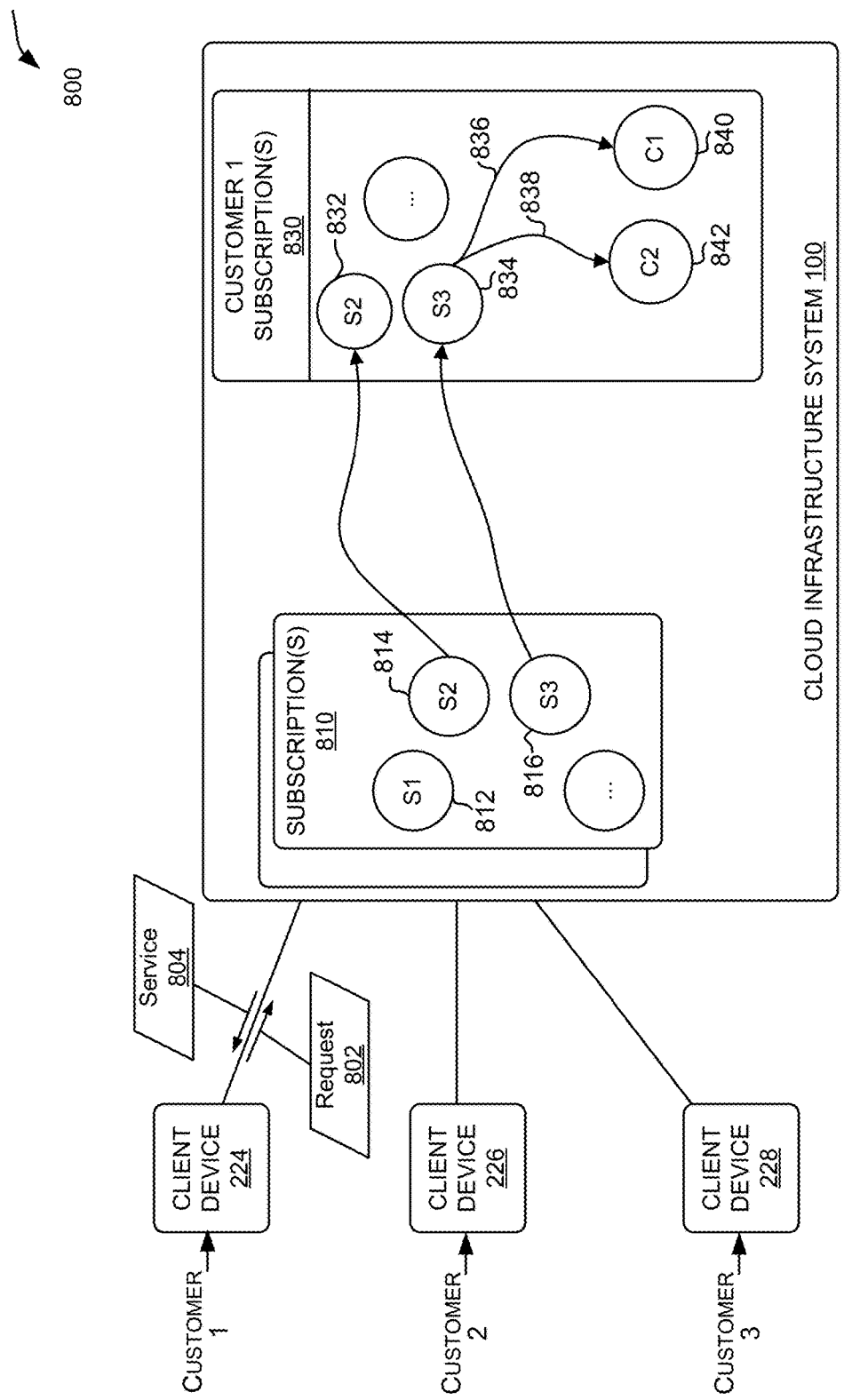
FIG. 8A depicts a simplified block diagram of a system environment for providing clone subscriptions according to some embodiments of the present invention.
Figure 8B:
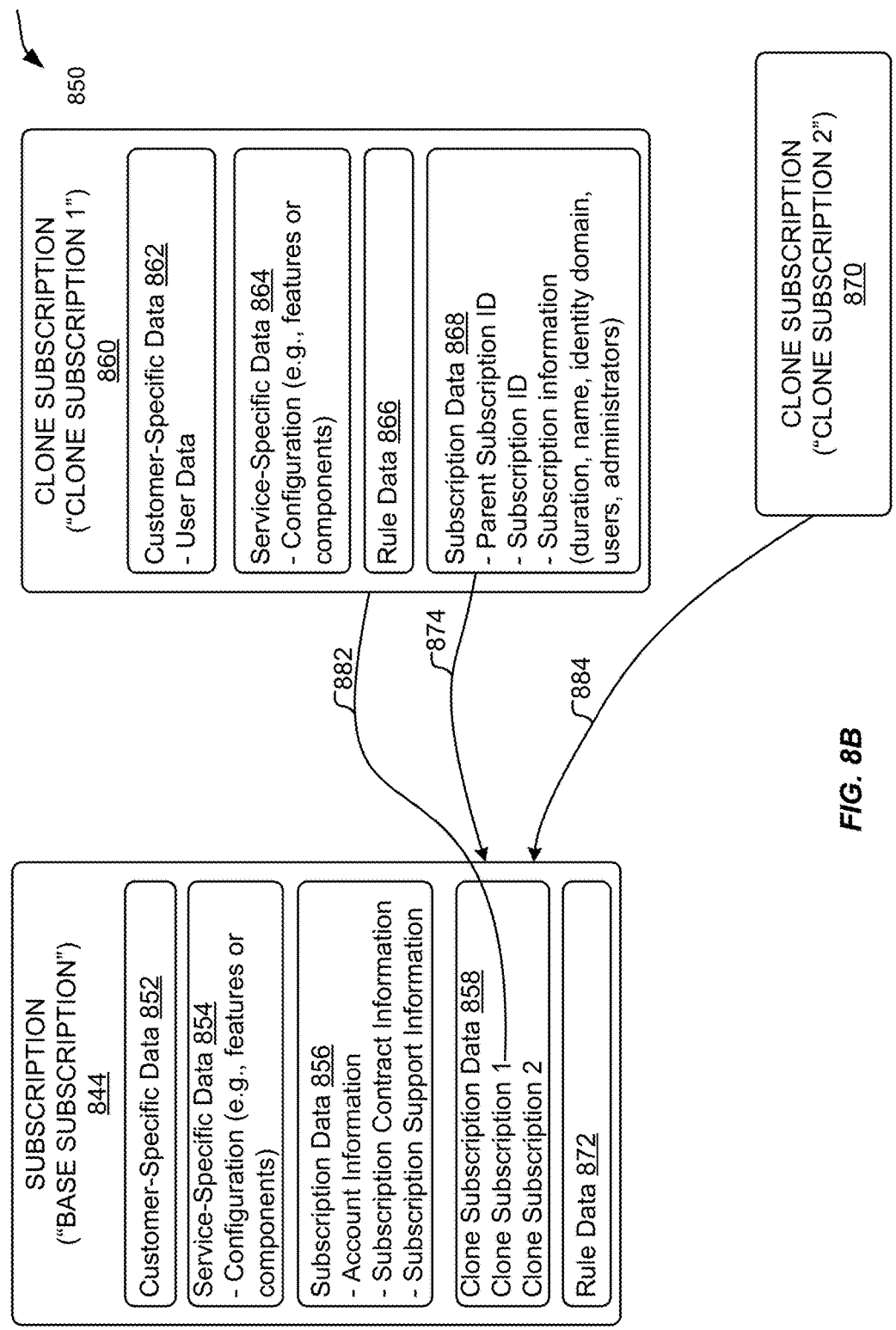
FIG. 8B depicts an example of data structures for subscriptions according to some embodiments of the present invention.
Figure 8C:
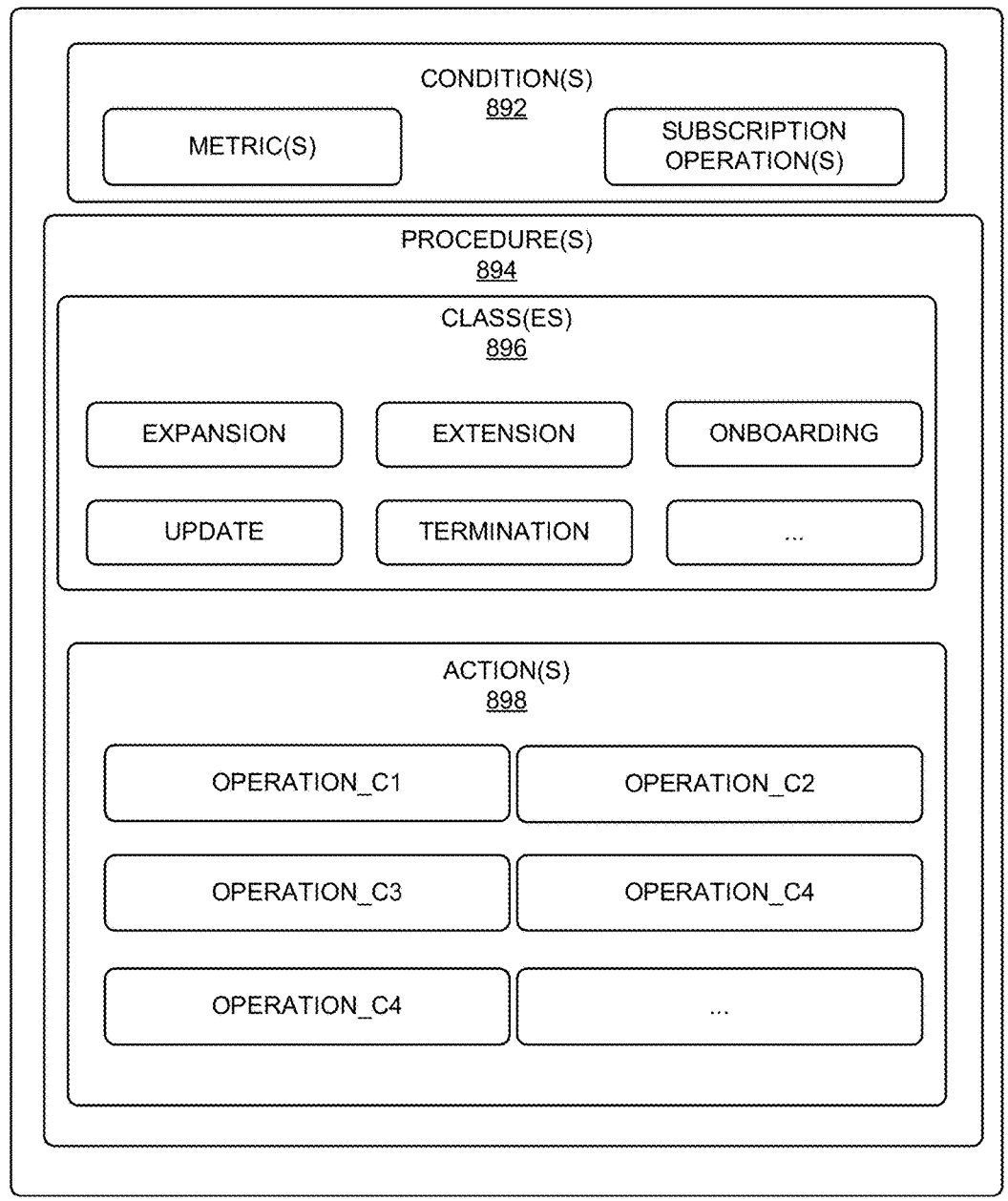
FIG. 8C depicts examples rules for managing clone subscriptions according to various embodiments.

Now turning to FIGS. 8A-8C, various embodiments are depicted for providing a clone subscription according to some embodiments of the present embodiment. FIG. 8A depicts a simplified block diagram of a system environment for providing clone subscriptions according to some embodiments. FIG. 8B depicts an example of data structures for subscriptions according to some embodiments. FIG. 8C depicts examples of rules for managing clone subscriptions accordingly. A clone subscription may be managed based on an association with a subscription in accordance to rules.

In FIG. 8A, system environment 800 is shown with several customers, such as a customer 1, a customer 2, and a customer 3 associated with client device 224, client device 226, and client device 228, respectively, for communication with cloud infrastructure system 100. Cloud infrastructure system 100 may manage one or more subscriptions (e.g., subscription(s) 810) for customers. Subscriptions 810 may contain data corresponding one or more subscriptions created for accessing one or more services provided by cloud infrastructure system 100. Subscriptions 810 may include base subscriptions. For example, subscriptions 810 may include subscription 812 ("S1"), subscription 814 ("S2"), and subscription 816 ("S3"). Cloud infrastructure system 100 may have assigned one of subscriptions 810 to one or more customers. In the example shown in FIG. 8A, S2 814 and S3 816 have been assigned to customer 1 as subscription S2 832 and subscription S3 834, respectively. As such, S2 832 and S3 834 are existing base subscriptions. Subscriptions assigned to a customer may be maintained in storage associated with the customer, such as subscriptions 830 ("customer 1 subscriptions"). Examples of data structures for storing subscriptions are described with reference to FIG. 8B.

In at least one example, a customer ("customer 1") may obtain service 804 from cloud infrastructure system 100. Service 804 may include a clone service. Access to a clone service (e.g., service 804) may be provided by a clone subscription established by cloud infrastructure system 100. Service 804 may be provided to customer 1 based on a request 802 made by customer 1 operating client device 224. In various aspects, a customer can be presented with a variety of options when ordering a service. The customer may choose to have each part of their order fully provisioned or partially provisioned. The customer may choose one or more clone subscriptions to obtain access to a service. Further below is an explanation of a process to providing a clone subscription.

As explained above, TAS module 204 of cloud infrastructure system 100 functions as an orchestration component that manages business processes associated with each subscription order and applies business logic to determine whether a subscription order should proceed to provisioning. TAS module 204 handles processing to process a subscription order based on a request by a customer for a service. In some embodiments, TAS module 204 can determine that a request (e.g., request 802) has been made for a clone service based on an existing subscription. TAS module 204 may establish the clone environment for the clone service based on the type of use indicated by a request from a customer. TAS module 204 can determine that a clone subscription has been requested based on a request made explicitly for a clone subscription.

A request (e.g., request 802) for a service from a customer to cloud infrastructure system 100 may include information that may be used to provide the service. Specifically, a request may include information (e.g., order information) that enables cloud infrastructure system 100 to determine a clone subscription to provide a customer for a requested service. In some embodiments, a request may indicate a type of service or a type of use intended for a requested service. Examples of the type of use include, but may not be limited to, development, testing, training, prototyping, load balancing, marketing, sales, design, production, etc. In some embodiments, a request to cloud infrastructure system 100 may indicate a type of subscription, e.g., a clone subscription or a regular subscription, desired by a customer. In some embodiments, a request may indicate one or more requirements for the requested service. The requirement(s) may include a fee constraint (e.g., a minimum fee and/or a maximum fee), a time limit for use of the requested service, an amount of users that will use the service, a type of service support desired, other requirements related to use of a service, or combinations thereof. Cloud infrastructure system 100 may determine, based on the requirements of a customer, a clone subscription to provide a customer to enable access to the requested service. The subscription may be provided based on an existing subscription (e.g., a base subscription).

Upon determining that a request is received for a clone subscription, TAS module 204 may implement operations for a clone process to establish a clone subscription. In an example shown in FIG. 8A, cloud infrastructure system 100 may provision one or more clone services for a clone subscription order based on request 802 by customer 1. For example, cloning process 836 and cloning process 838 may be implemented to establish clone subscription 840 ("C1") and clone subscription 842 ("C2"), respectively, using base subscription S3 834.

The operations for a clone process may include performing the steps described with reference to FIGS. 3A and 3B to process the subscription order to establish C1 840 and C2 842. Processing the subscription order may include determining a fee associated with the clone subscription. The fee for the clone subscription may be based on a variety of criteria, including, but not limited to, the type of use intended for the clone service provided for the clone subscription and the terms of the base subscription. In some embodiments, the fee may depend on the additional types of services that are requested for the clone subscription. In some embodiments, the fee for the clone subscription may be based on the configuration of the clone subscription, where the fee may be adjusted based on a variation to the clone subscription. In the example shown in FIG. 8A, C1 840 and C2 842 may be established based on information included in request 802.

Upon establishing a clone subscription, TAS module 204 may send a request to SDI module 206 to provision a clone service for each of clone subscriptions C1 840 and C2 842. Provisioning a clone service may include allocating resources and configuring those resources needed to fulfill the subscription order to provide the clone service. A cloning process may include duplicating the resource(s) provisioned for a service enabled for a base subscription. The cloning process may include configuring a clone service to be similar (e.g., a clone) to that of the configuration of the service provided for a base subscription. For the example in FIG. 8A, the clone service for C1 840 and C2 842 may be provisioned as a clone based on the service provisioned for base subscription S3 834.

In FIG. 8B, an example is depicted of data structures for subscriptions according to some embodiments of the present invention. One or more data structures may be implemented by cloud infrastructure system 100 to store data related to subscriptions. Examples of data structures includes, without limitation, a linked list, a table, an array, a hash table, a graph, and the like.

Subscription 844 is an example of a data structure for storing information related to a subscription (a "base subscription") established by cloud infrastructure system 100. In the example of FIG. 8b, subscription 844 is shown with data corresponding to a single subscription for a customer. However, a data structure for a subscription may store information about one or more subscriptions corresponding to any number of customers.

Subscription 844 may include data corresponding to a customer (e.g., customer-specific data 852). Customer-specific data 852 may include data corresponding to use of a service accessed using a base subscription corresponding to subscription 844. For example, customer-specific data 852 may include customer mailboxes corresponding to a sales cloud service accessed by a subscription to the service. In another example, customer-specific data 852 may include tables generated by use of a database service.

Subscription 844 may include data corresponding to a service (e.g., service-specific data 854) accessible by a base subscription corresponding to subscription 844. Service-specific data 854 may contain data related to providing the service enabled for a subscription. For example, service-specific data 854 may include product-specific metadata related to a product (e.g., a service or a component) provided by the base subscription corresponding to subscription 844. In some embodiments, service-specific data 854 may indicate a configuration (e.g., a physical configuration of resources) for a service provided for the base subscription. The configuration may indicate resource constraints, such as one or more components (e.g., features) enabled or disabled for a service.

Subscription 844 may include subscription data 856 related to one or more subscriptions provided to a customer. In some embodiments, all or part of subscription data 856 may be included in service specific data 854. Subscription data 856 may include account information for an account established for a subscription corresponding subscription 844. The account information may be associated with a customer identity. The information about a customer identity (e.g., a user identity, a password, contact information, and the like) may be stored in a customer identity data structure (e.g., a customer identity object). Subscription data 844 may include subscription contract information about a contract related to a subscription and the entitlements provided by the contract. Subscription data 844 may include subscription support information related to a subscription.

Subscription data 844 may include clone subscription data 858 indicating information about one or more clone subscriptions associated with a subscription identified by subscription data 856. Clone subscription data 858 may include information indicating an association between base subscription corresponding to subscription 844 and one or more clone subscriptions. For example, clone subscription 858 may indicate an association 882 between the base subscription and a clone subscription ("clone subscription 1") corresponding to a data structure 860. In another example, clone subscription 858 may indicate an association 884 between the base subscription corresponding to subscription 844 and a clone subscription ("clone subscription 2") corresponding to a data structure 870. Both of clone subscriptions 1 and 2 may be established based on the base subscription corresponding to subscription 844.

The life cycles of a base subscription (e.g., base subscription corresponding to subscription 844) and a clone subscription (e.g., clone subscription 1 or clone subscription 2) may be associated with each other. When the life cycle of a base subscription and a clone subscription are associated with each other, changes or updates to a configuration or operation of a service provided for the base subscription may be propagated to a clone service provided by the clone subscription. For example, a change in a configuration stored in service-specific data 854 may be applied to the configuration of clone subscription 1 and clone subscription 2 that are associated with the base subscription.

In some embodiments, an association of the life cycle of a base subscription and a clone subscription may be based on one or more rules. The rules may be defined with respect to the base subscription. Subscription 844 may include rule data 872 indicating one or more rules for managing a life cycle of association 882 and association 884 with clone subscription 1 and clone subscriptions 2, respectively. Examples of rules are described below with reference to FIG. 8C. In some embodiments, access to the service provided by a clone subscription and access to the service provided by the base subscription may be managed by the rule(s) based on an association between the clone subscription and the base subscription.

Clone subscription 860 and clone subscription 870 are examples of data structures for storing information related to a clone subscription established by cloud infrastructure system 100. In the example of FIG. 8b, each of clone subscription 860 and clone subscription 870 are shown with data corresponding to a single clone subscription, clone subscription 1 (e.g., C1 840 of FIG. 8A) and clone subscription 2 (e.g., C2 842), respectively, for a customer. A data structure for a clone subscription may store information about one or more clone subscriptions corresponding to any number of customers.

A clone subscription data structure (e.g., clone subscription 860 or clone subscription 870) may include customer-specific data (e.g., customer-specific data 862). Customer-specific data for a clone subscription may include data corresponding to use of a service accessed using a clone subscription.

A clone subscription data structure may include service-specific data (e.g., service-specific data 864). Service-specific data for a clone subscription may indicate information about a clone subscription such as one or more attributes of a service provided for the clone subscription. Service-specific data may include product-specific metadata about a product (e.g., a service or a component). Service-specific data may indicate a configuration (e.g., a physical configuration of resource) for a clone service provided for the clone subscription. The configuration may indicate resource constraints, such as one or more components (e.g., features) enabled or disabled for a clone service. Not all features or components of a base subscription may be provided to a customer for a clone subscription established based on the base subscription.

A customer may choose to vary a configuration of a clone subscription (e.g., a clone configuration) from a configuration of a base subscription (e.g., a base configuration). A customer can define a clone configuration at the time of a request for a clone subscription or after a clone subscription has been provisioned. The cloning process may be implemented using the base configuration and the clone configuration. In instances where the clone configuration is different from the base configuration, the cloning process may configure the clone subscription according to the clone configuration for the differences with the base configuration. As such, the clone service may be provisioned differently than the service for the base subscription when the clone configuration differs from the base configuration.

In some embodiments, a clone configuration for a clone subscription may indicate that a one or more components are to be enabled/disabled for the clone subscription, different from a configuration of the base subscription. In one example, an infrastructure service component related to security or storage may be disabled. In another example, a service component (e.g., activity streams cloud component or a sales predictor component) that is enabled for a base subscription may be enabled for a clone subscription. In another example, a performance feature like large indexes may not be enabled for a clone subscription.

In some embodiments, a clone configuration can be adjusted according to a sizing metric, such as a user count, to an amount that is different from a base subscription. The sizing metric may be adjusted corresponding to a different use of a clone subscription.

In some embodiments, a clone subscription may be configured to have a term that is less than a term of the base subscription. For example, a base subscription could be requested for a three-year term, while a clone subscription could be configured for a single year. The customer may choose this to support the development/testing activity that is expected only during the first year.

The clone subscription may be provisioned based on adjustments in the clone configuration compared to the base configuration. The clone configuration may be adjusted after provisioning based on a change in needs of a customer assigned the clone subscription.

In some embodiments, a clone subscription may be configured based on one or more rules indicating a clone configuration. The rule(s) can be determined based on rule data (e.g., rule data 866) stored for a clone subscription or can be determine based on rule data (e.g., rule data 872) stored for a base subscription from which the clone subscription is established.

A clone configuration corresponding to each of multiple clone subscriptions (e.g., C1 840 and C2 842) may be modified independent of one another. Clone subscriptions may be configured differently from each other. The configuration for clone subscriptions can be varied when a customer intends each clone subscription to be used for a different purpose. For example, a clone configuration of C1 840 may be modified for testing. A clone configuration of C2 842 may remain unmodified, such that it is similar to (e.g., a clone of) the base configuration of base subscription S3 834 for running features in a production environment similar to that of a product environment implemented using the base subscription.

In some embodiments, a schema may be created for establishing a clone configuration for a clone subscription from a base subscription. The schema can be defined with respect to a type of service, a specific service, a specific product offering, other types of categories for a subscription to a service, or combinations thereof. As such, the schema may indicate rules, such as rules 890, which can be used to determine a clone subscription based on the schema.

A clone subscription data structure may include rule data 866 indicating one or more rules for managing a life cycle of an association (e.g., association 882) between a clone subscription (e.g., clone subscription 1) and a base subscription. Examples of rules are described below with reference to FIG. 8C.

Subscription data (e.g., subscription data 868) included in a clone subscription data structure may include subscription information about clone subscription (e.g., clone subscription 1). Subscription data may indicate identification information for a subscription (e.g., subscription identifier or subscription name), a subscription duration, and identity information for users (e.g., administrators and non-administrators). In some embodiments, subscription data for a clone subscription may include a parent subscription identifier that identifies a base subscription from which the clone subscription was established. For example, subscription data 868 may include a parent subscription ID that identifies a base subscription corresponding to base subscription 844 from which clone subscription 1 was established. The parent subscription ID may indicate a reference (e.g., reference 874) to a base subscription data structure (e.g., base subscription 844) corresponding to a base subscription from which the clone subscription (e.g., clone subscription 1) was created. The reference can be used to identify data corresponding to clone subscriptions generated based on a base subscription.

FIG. 8C depicts examples of rules 890 for managing clone subscriptions according to various embodiments. Rules 890 may include information corresponding to one or more rules, such as a set of rules. Rules 890 may be pre-defined by a cloud infrastructure system, may be customer-defined, or a combination thereof. Rules 890 may be defined in a data file (e.g., an extended markup language (XML) file) or based on input received from a customer via a client device.

A customer may define rules at a customer level or at a subscription level. A customer level rule may be defined with respect to subscriptions (e.g., clone subscriptions) created by the customer. In some embodiments, a customer level rule may be defined with respect to clones of a specific product created by the customer. A subscription level rule may be defined with respect to a base subscription such that the subscription level rule applies to clone subscriptions established from the base subscription for which the rule is defined. These types of rules may be applied at inception of a subscription as well as when changes to a subscription are made at a later time.

Rules 890 may be used to manage an association between a base subscription and one or more clone subscriptions (e.g., clone subscription 1 and clone subscription 2). A change to a base subscription (e.g., base subscription 844) may be applied to clone subscriptions based on rules 890. For example, a change to a configuration of a base subscription may be applied as a change to a clone configuration of a clone subscription created based on that base subscription. As explained above, a clone configuration may be varied from a base subscription.

The following are some examples of such rules:
- A clone created from a base subscription should initially have the same configuration as the base subscription, but the clone's duration can be shorter than that of the base subscription.
- All functional changes made to a base subscription, such as enabling/disabling a component, may be applied to the clones associated with the base subscription, but sizing changes such as increasing/decreasing user count should not applied to the clones.
- When a base subscription is renewed, all the clones currently associated with the base subscription should also be renewed for their respective current terms; and
- When a base subscription is terminated, all the clones associated with the base subscription should also be terminated.

In at least one example, rules 890 can be based on one or more conditions 892. A condition 892 can be defined based on one or more criteria. For example, a condition 892 is based on one or more metrics (e.g., a metric related to operation in cloud infrastructure system 100). Examples of metrics may include, without limitation, a system metric, a product metric, a component metric, a customer metric, and the like. A condition may also be based on the operation being performed on the base subscription. Examples of base subscription operations may include, without limitation, "onboard clone" (e.g., a clone subscription created based on the base subscription), "add component", "remove component", "increase user count," and "decrease user count". In some embodiments, a condition can be represented as a logical relation involving logical operators like disjunction, conjunction and negation (e.g., "user's clone subscription count"<100 AND base subscription operation="add component"). A rule can be satisfied if each of the conditions of the rule is satisfied.

In another example, rules 890 can include one or more procedures 894. For example, procedure 894 may be based on one or more classes 896. A class 896 may be a type of operand to be applied to a clone subscription. Some examples of types of operands are those referred to above with respect to direct operations performed for a base subscription. In another example, an operand can correspond to an operation such as "onboarding" by which a clone is created as an "onboard clone" (i.e., create a clone based on a parent subscription). Other operands can include "expansion," "update," "termination," and "extension." Expansion can include operations such as increasing or decreasing a user count. Termination can include operations such as terminating a clone subscription. Update can include operations such as adding to or removing one or more components in a clone subscription. Extension may include operations such as extending a term of a clone subscription. Upon satisfaction of a rule, a clone configuration may be modified based on the rule.

In another example, procedure 894 may be based on one or more actions 898. An action 898 can be defined based on one or more operations that can be performed on a clone subscription (a "clone subscription operation"). Some examples of clone subscription operation are "clone all data", "clone no data", "clone selected data", "add component", "add component if in the specified list", "remove component" and "remove component if in the specified list."

A clone subscription may be modified based on a type of operand in class 896 and the specified operations in action 898.

In some embodiments, a rule may be defined by one or more conditions 892, one or more procedures 894, one or more actions 898, or combinations thereof. A rule may be satisfied based on satisfaction of one or more criteria defined for the rule. Upon satisfaction of a rule, a clone configuration may be changed based on changes indicated by the rule.

Figure 9:
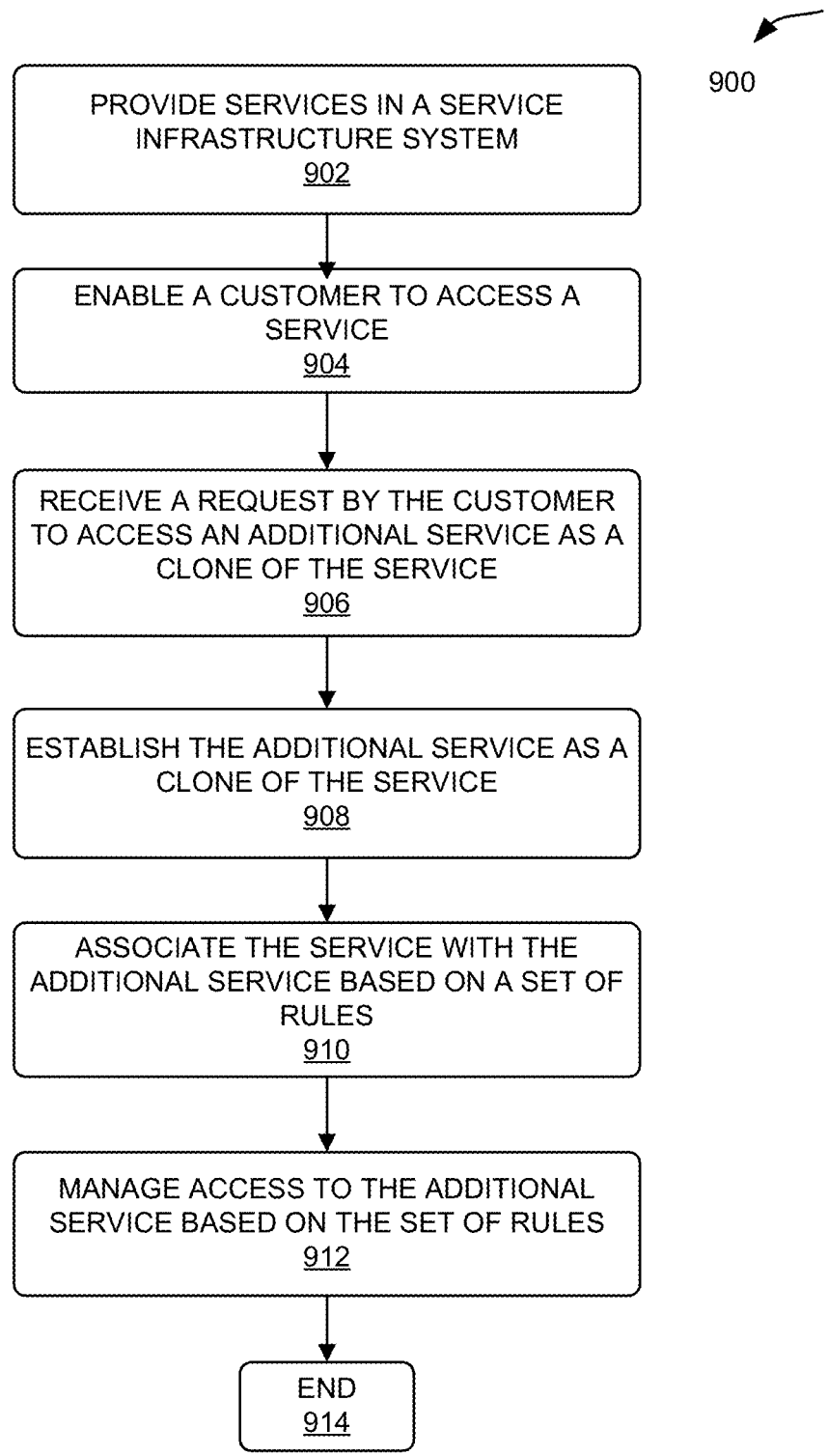
FIG. 9 is a flowchart of a process for managing the life cycle of a clone subscription according to various embodiments.

FIG. 9 is a flowchart 900 of a process for managing the life cycle of a clone subscription according to various embodiments. Specifically, process depicted by flowchart 900 may provide a customer with a clone subscription of a service and may manage a life cycle of the clone subscription based on a set of rules (e.g., rules 890). In some embodiments, the process depicted by flowchart 900 may be implemented by all or part of a service infrastructure system (e.g., cloud infrastructure system 100).

The processing depicted with reference to FIG. 9 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 9 is not intended to be limiting. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives. The process depicted by flowchart 900 begins in at block 902.

At block 902, one or more services are provided in a service infrastructure system (e.g., cloud infrastructure system 100 of FIG. 1). The service infrastructure system may include or implement a multi-tenant environment. Examples of services may include a CRM service, a HCM service, a Java® service, or other computing services.

In some embodiments, providing one or more services includes provisioning one or more of the services in the service infrastructure system prior to receiving a request by a customer to access one of the services. A service may be provisioned based on one or more criteria. For example, a service may be provisioned based on one or more metrics related to operation of the service infrastructure system. In another example, a service may be provisioned based on one or more metrics associated with demand for the service. In yet another example, a service may be provisioned based on one or more metrics associated with the type of the service.

A customer may be enabled to access a service at block 904. Enabling access to a service may include providing a subscription (e.g., a base subscription) to a user. For example, with reference to FIG. 8A, a customer ("Customer 1") may be provided with subscription S2 832 and subscription S3 834. A subscription may indicate access granted to the service. In some embodiments, a client device (e.g., any one of client devices 224, 226, 228) may provide a user interface to enable a user to access the service. Information about the subscription enabling access to a service may be presented to the customer via the user interface.

A request by a customer is received at block 906. For example, request 802 may be received from client device 224. The request may be to access to an additional service as a clone (e.g., a clone service) based on the service enabled to the customer at block 904. In some embodiments, the additional service may be requested by the customer for a use that is different from a use of the service enabled at block 904. For example, the additional service may be used to test a new feature before enabling the feature on a production system, whereas the service enabled at block 904 may be used for implementation of a production system. The additional service may be similar or related to the service enabled to the customer at block 904, or the additional service may be different from the service.

At block 908, the additional service may be established as a clone of the service enabled at block 904. Establishing a clone of a service may include determining a subscription (e.g., a clone subscription) for the clone service. The clone subscription may be determined based on cloning a subscription corresponding to the service. The additional service may be provided to a customer by a subscription ("clone subscription) as a clone of the subscription corresponding to the service enabled at block 904. For example, subscription C1 840 may be generated 836 as a clone based on subscription S3 834 in FIG. 8A. In this example, C1 840 may provide a clone service based on a service provided by S3 834. As such, a clone subscription may be produced for establishing a clone of a service. The clone subscription may provide access to the "cloned" service.

At block 910, the service enabled at block 904 may be associated with the service ("clone service") established at block 908. Two services may be associated with each other based on an association between the subscriptions corresponding to those services. For example, clone subscription 1 860 for a clone service may be associated with (e.g., association 882) a subscription 844 (e.g., a base subscription) for a service.

In some embodiments, associating a base subscription corresponding to a service with a clone subscription corresponding to a clone service may include associating a life cycle of the subscription with a life cycle of the clone subscription. Accordingly, life cycles of the base and clone subscriptions may be tied together. In some embodiments, associating the service enabled for a base subscription with the clone service established for a clone subscription may include associating the life cycles of these services. As explained above, when two subscriptions are associated with each other, a change to a base subscription may be propagated to the clone subscription. For example, when access to the service corresponding to the base subscription is terminated, access to the clone service by the customer is terminated. In another example, when access to the service corresponding to the base subscription is updated, access to the clone service may be updated based on the access updated for the base subscription.

In some embodiments, an association between subscriptions (e.g., a base subscription and a clone subscription) may be based on a set of rules (e.g., rules 890 of FIG. 8C). All or part of the set of rules may be pre-defined or based on a default according to the subscriptions. For example, the set of rules may be based on a product (e.g., a service) provided by the base subscription. A customer may provide input to modify the pre-defined set of rules or to create a new set of rules.

At block 912, access to the additional, or clone, service may be managed based on the set of rules. For example, access to a clone service provided for clone subscription 1 860 of FIG. 8B may be managed based on a set of rules, e.g., 890 of FIG. 8C. Flowchart 900 ends at block 914.

In various embodiments, a rule used to manage a clone service defines one or more conditions and one or more actions. Upon the one or more conditions being satisfied, the one or more actions are performed on an associated clone subscription. The one or more actions may correspond to the direct actions that a customer may take on a clone subscription as discussed above.

In some embodiments, when a clone service is associated with a base service, access to the clone service may be managed based on a set of rules (e.g., rules 890). The access to the clone service may be managed using the rules in response to a change to the base service. As explained above with reference to FIG. 8C, one or more rules may be used to manage a life cycle of a clone subscription and therefore, access to a clone service provided for the clone subscription. For example, access to a clone service may be terminated when the base service associated with the clone service is terminated.

In some embodiments, access to a clone service may be managed by performing one or more actions associated with a class of procedure to be performed on the clone service. The class of procedure may be determined based on one or more criteria. For example, a class of procedure may be determined based on one or more metrics of the base service (e.g., performance of the service) associated with the clone service. Another criterion may be an operation performed on the base service based on a change to the base service. In some embodiments, a class of procedure can be associated with actions, some of which may be in a different rule. For example, in one rule, the class of procedure may be "UPDATE" and the action may be "ADD COMPONENT", while in another rule, the class of procedure may be "UPDATE," but the action may be "REMOVE COMPONENT."

Figure 10:
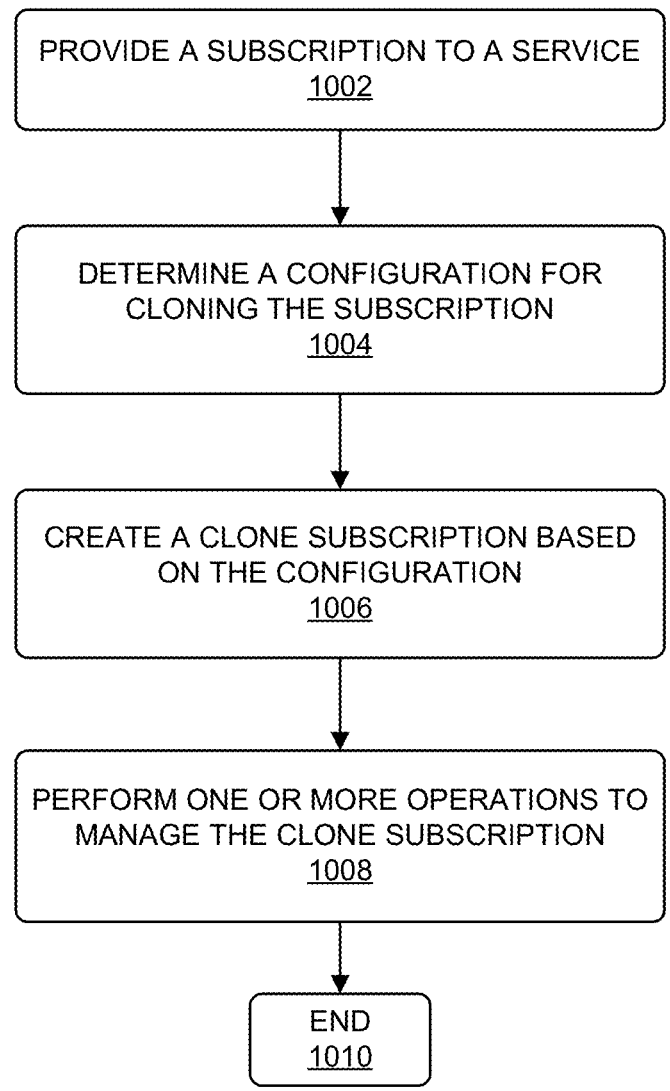
FIG. 10 is a flowchart of a process for subscription cloning according to various embodiments.

FIG. 10 is a flowchart 1000 of a process for subscription cloning according to various embodiments. In some embodiments, all or part of a service infrastructure system (e.g., a cloud infrastructure system 100 of FIG. 1) may implement the process depicted in FIG. 10.

The processing depicted with reference to FIG. 10 enables a customer to modify a clone subscription with respect to a subscription from which the clone subscription is established. A modification can be requested when a clone subscription is created as well as later by direct operations on a clone subscription. As explained earlier, a modification to a clone subscription may include a modification to a configuration related to the service provided for the clone subscription or may include a modification to the configuration of the subscription.

The processing depicted in FIG. 10 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 10 is not intended to be limiting. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives. The process depicted by flowchart 1000 begins at block 1002.

At block 1002, a subscription (e.g., a base subscription) to a service may be provided to a customer. For example, service 804 may be provided to customer 1 at client device 224. Providing a service may include provisioning the service. A service may be provisioned according to a configuration indicated by a customer. Providing a service may include determining a subscription to the service and enabling access to the service based on the subscription. In various embodiments, a list of valid subscriptions may be provided to a client device. A customer may choose one of the subscriptions.

A configuration (e.g., a clone configuration) for cloning a subscription (e.g., the subscription provided at block 1002) may be determined at block 1004. As explained earlier, a clone configuration may indicate one or more criteria for configuring a subscription that is cloned based on an existing subscription. For example, a clone configuration may indicate a duration of use of a clone service (e.g., shorter than a duration of a service corresponding to a base subscription). In another example, a clone configuration may indicate a component to enable/disable for a service provided for a clone subscription.

A clone configuration may be determined using a variety of methods. In some embodiments, a clone configuration may be determined based on input received from a customer. The input may indicate an intended use or requirements of a clone subscription. The clone configuration may be determined based on the input from the customer. For example, a customer operating a client device may provide information to a service infrastructure system (e.g., cloud infrastructure system 100). The information may indicate a clone configuration (e.g., a clone variation).

In some embodiments, a clone configuration may be determined based on analysis information determined by a service infrastructure system. The analysis information may include metric information related to operations performed by a service infrastructure system for a customer. The analysis information may include information about operations performed by a customer using a service provided by the service infrastructure system.

At block 1006, a clone subscription may be created based on a clone configuration (e.g., a configuration determined at block 1004). A clone subscription may be created based on a subscription (e.g., the subscription provided at block 1002) and the clone configuration. The clone subscription can be created based on customer preferences, pre-defined rules as discussed earlier, as well as other criteria described with reference to FIG. 8C.

One or more operations may be performed to manage a clone subscription (e.g., the clone subscription created at block 1006) at block 1008. The operation(s) may be performed during a life cycle of the clone subscription. An operation can be performed directly on the clone subscription to modify the clone service provided for the clone subscription. Flowchart 1000 ends at block 1010

In some embodiments, a direct operation can include modifying a clone configuration corresponding to a clone subscription. The clone configuration may be modified based on input received from a customer or based on information determined by a service infrastructure system. It may be useful to enable a customer to modify a clone subscription based on the needs of the customer. Examples of direct operations may include, without limitation, operations performed on a clone service corresponding to the clone subscription. The operations may include enabling/disabling a component provided for a clone service or adjusting a size change (e.g., increasing/decreasing user count) of users permitted to access the clone service.

CONCLUSION

Figure 11:
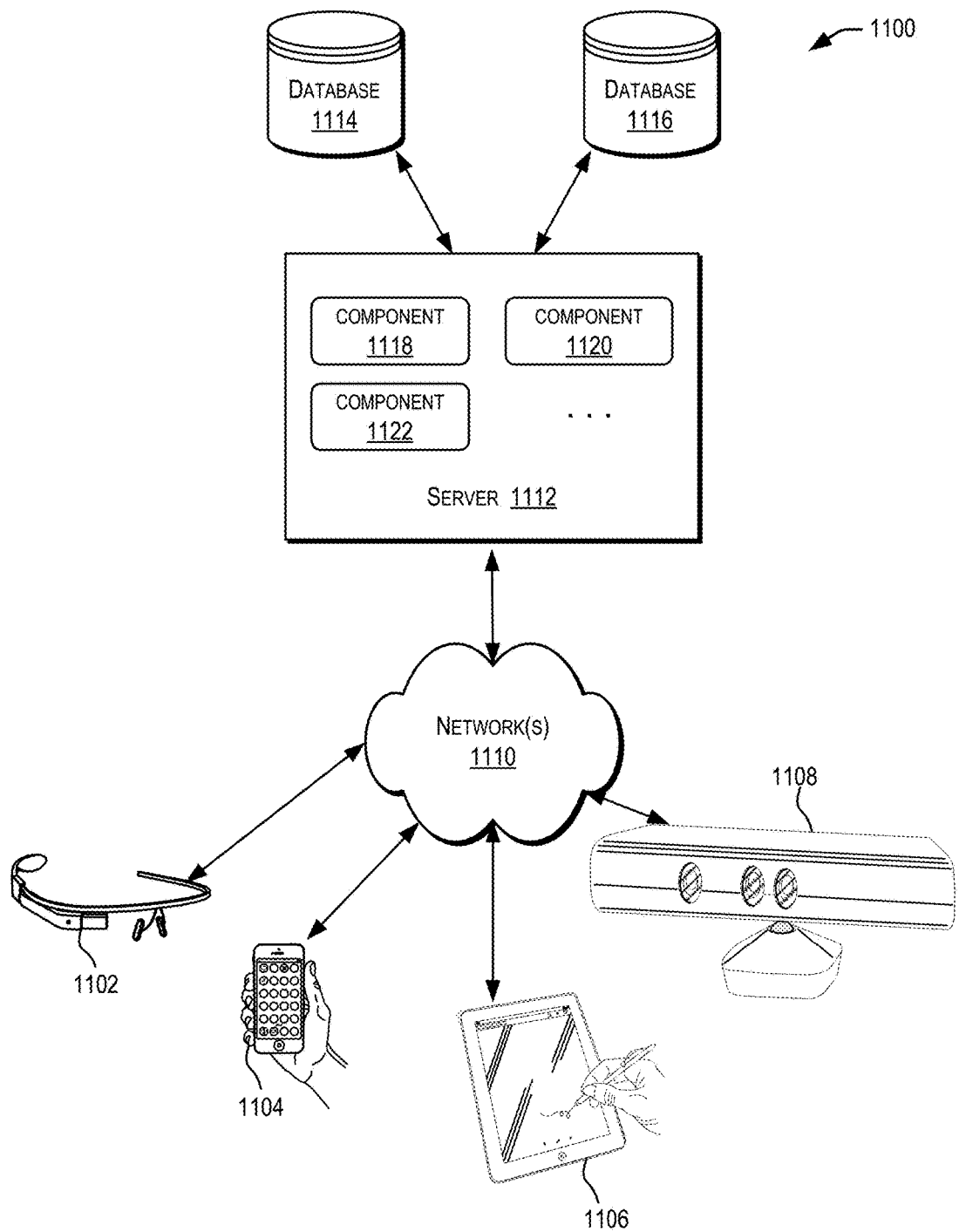
FIG. 11 depicts a simplified diagram of a distributed system for implementing an embodiment.

FIG. 11 depicts a simplified diagram of a distributed system 1100 for implementing an embodiment. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications such as services and applications for providing a user with access to a service provided by a cloud infrastructure system based on an existing service (e.g., cloning the existing service). In certain embodiments, server 1112 may also provide other services or software applications can include non-virtual and virtual environments. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in FIG. 11, software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in FIG. 11 is thus one example of a distributed system for implementing an embodiment system and is not intended to be limiting.

Client computing devices 1102, 1104, 1106, and/or 1108 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1110.

Although distributed system 1100 in FIG. 11 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 can include one or more virtual machines running virtual operating systems, or other computing architectures involving virtualization. One or more flexible pools of logical storage devices can be virtualized to maintain virtual storage devices for the server. Virtual networks can be controlled by server 1112 using software defined networking. In various embodiments, server 1112 may be adapted to run one or more services or software applications described in the foregoing disclosure. For example, server 1112 may correspond to a server for performing processing as described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like.

Server 1112 may also include one or more applications to display the data feeds and/or real-time events via one or more display devices of client computing devices 1102, 1104, 1106, and 1108.

Distributed system 1100 may also include one or more databases 1114 and 1116. These databases may provide a mechanism for storing information such as user interactions information, usage patterns information, adaptation rules information, and other information used by embodiments of the present invention. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

Figure 12:
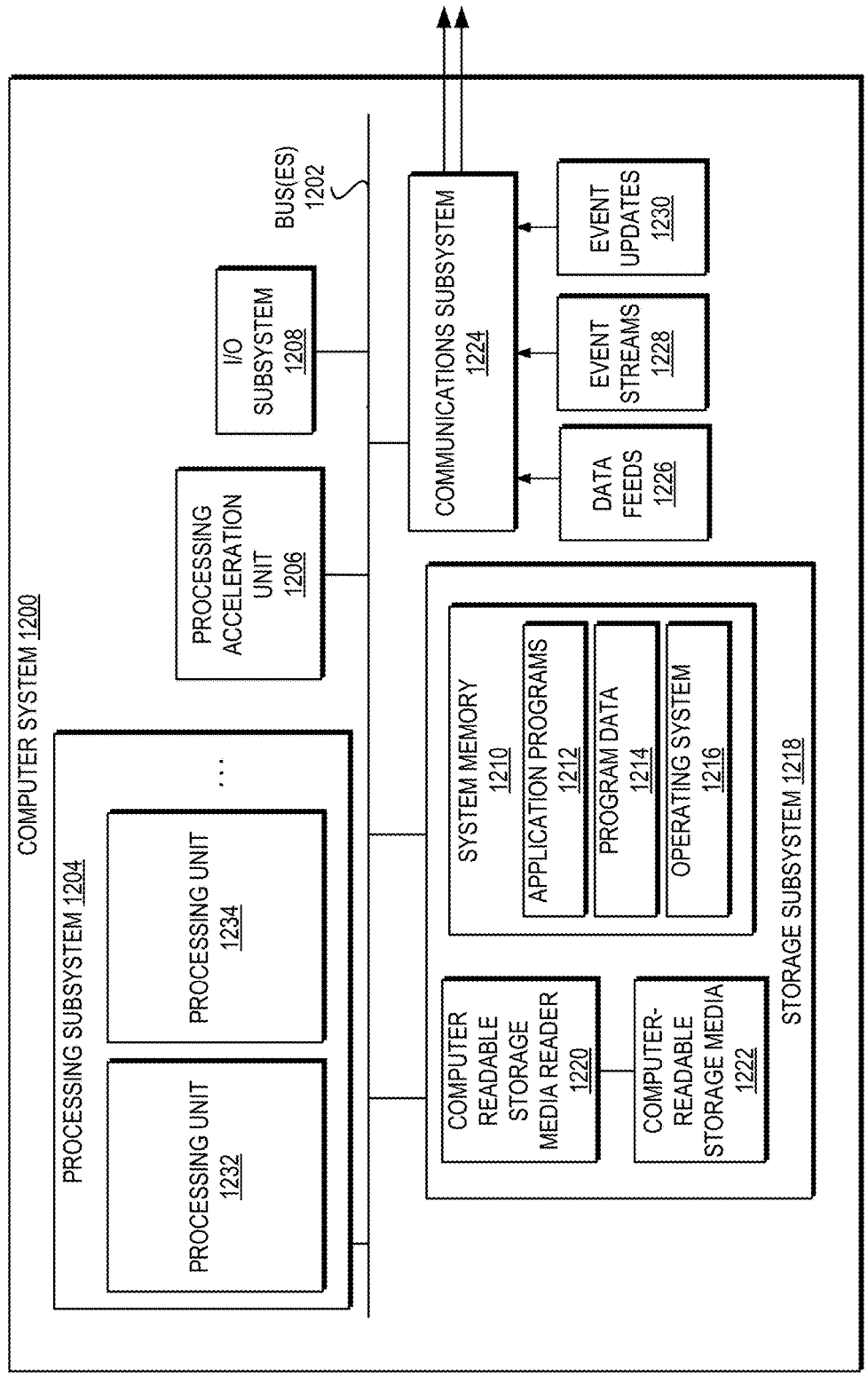
FIG. 12 illustrates an exemplary computer system that may be used to implement an embodiment of the present invention.

FIG. 12 illustrates an exemplary computer system 1200 that may be used to implement an embodiment of the present invention. In some embodiments, computer system 1200 may be used to implement any of the various servers and computer systems described above. As shown in FIG. 12, computer system 1200 includes various subsystems including a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 may include tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processing units 1232, 1234, etc. A processing unit may include be one or more processors, including single core or multicore processors, one or more cores of processors, or combinations thereof. In some embodiments, processing subsystem 1204 can include one or more special purpose co-processors such as graphics processors, digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1222 including potentially on one or more storage devices. Through suitable programming, processing subsystem 1204 can provide various functionalities described above for providing a user with access to a service provided by a cloud infrastructure system based on an existing service (e.g., cloning the existing service).

In certain embodiments, a processing acceleration unit 1206 may be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term "input device" is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information that is used by computer system 1200. Storage subsystem 1218 provides a tangible non-transitory computer-readable storage medium for storing the basic programming and data constructs that provide the functionality of some embodiments. Software (programs, code modules, instructions) that when executed by processing subsystem 1204 provide the functionality described above may be stored in storage subsystem 1218. The software may be executed by one or more processing units of processing subsystem 1204. Storage subsystem 1218 may also provide a repository for storing data used in accordance with the present invention.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM) or dynamic random access memory (DRAM).

By way of example, and not limitation, as depicted in FIG. 12, system memory 1210 may store application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1222 may store programming and data constructs that provide the functionality of some embodiments. Software (programs, code modules, instructions) that when executed by processing subsystem 1204 a processor provide the functionality described above may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1222 may provide storage of computer-readable instructions, data structures, program modules, and other data for computer system 1200.

In certain embodiments, storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for storing computer-readable information.

In certain embodiments, computer system 1200 may provide support for executing one or more virtual machines. Computer system 1200 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1200. Accordingly, multiple operating systems may potentially be run concurrently by computer system 1200. Each virtual machine generally runs independently of the other virtual machines.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, communications subsystem 1224 may receive input communication in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

That which is claimed is:

1. A method comprising:
providing multiple services in a service infrastructure system;
enabling, by the service infrastructure system, a customer to access a first service in the multiple services via a base subscription;
receiving, by the service infrastructure system, a request by the customer to access a second service;
establishing, by the service infrastructure system, in response to the request, a clone subscription that is cloned from the base subscription, the cloned subscription enabling the customer to access the second service that is cloned from the first service;
generating a data structure for storing configuration for the clone subscription;
creating, by the service infrastructure system, an association between the base subscription and the clone subscription, the association based upon a set of one or more rules, the set of one or more rules controlling how a change made to configuration for the base subscription is propagated to the configuration for the clone subscription, wherein the set of one or more rules comprises a first rule identifying a condition based upon one or more criteria, and wherein the condition further identifies a numerical threshold based upon one or more metrics;
detecting, by the service infrastructure system, a change to the configuration for the base subscription;
in response to detecting the change, determining whether the condition of the first rule is satisfied; and
upon determining that the condition of the first rule is satisfied based on the one or more metrics satisfying the numerical threshold, modifying the configuration for the clone subscription per the first rule, the modifying comprising modifying data stored in the data structure.

2. The method of claim 1, further comprising:
establishing, based on information included in the request, the clone subscription;
wherein the information included in the request includes at least one of: a type of the second service, a type of use intended for the second service, or one or more requirements for the second service.

3. The method of claim 1 wherein the set of one or more rules indicate that the second service is a clone of the first service; and
wherein the second service is established based on the set of one or more rules.

4. The method of claim 1, wherein creating an association between the base subscription and the clone subscription includes associating a life cycle of the base subscription with a life cycle of the clone subscription.

5. The method of claim 4 wherein:
the change to the configuration of the base subscription comprises changing a life cycle of the first service; and
modifying the configuration for the clone subscription comprises changing the life cycle of the second service based on the change of the life cycle of the first service.

6. The method of claim 1, wherein:
the change to the configuration of the base subscription comprises adding a first resource component for provisioning of the first service, the change to the configuration of the base subscription being changed based on a request from the customer; and
modifying the configuration for the clone subscription comprises adding a second resource component for provisioning of the second service, the addition of the second resource component being based on the addition of the first resource component for provisioning of the first service.

7. The method of claim 1 wherein the services include a Java® service, a customer relationship management (CRM) service, or a human capital management (HCM) service.

8. The method of claim 1, further comprising generating a data structure for the base subscription,
wherein the data structure for the base subscription indicates a plurality of clone subscriptions for the customer; and
wherein the plurality of clone subscriptions are associated with a plurality of types of uses different from a type of use associated with the base subscription.

9. The method of claim 1, wherein:
the change to the configuration of the base subscription comprises enabling a first resource component for provisioning of the first service; and
modifying the configuration for the clone subscription comprises disabling the first resource component for provisioning of the second service.

10. The method of claim 1,
wherein the one or more metrics comprises at least one of: a number of users granted access to at least one of the first service or the second service, a demand for at least one of the first service or the second service, or a measurement of one or more resources provisioned by the service infrastructure system for at least one of the first service or the second service.

11. The method of claim 1, wherein the condition further identifies an operation performed on the configuration for the base subscription;
wherein the condition is satisfied when the identified operation is performed on the configuration for the base subscription.

12. A system comprising:
at least one processor; and
a memory operatively coupled with the at least one processor, the at least one processor executing computer code stored in the memory for:
providing multiple services in a service infrastructure system;
enabling a customer to access a first service in the multiple services via a base subscription;
receiving a request by the customer to access a second service;
establishing, in response to the request, a clone subscription that is cloned from the base subscription, the cloned subscription enabling the customer to access the second service that is cloned from the first service;
generating a data structure for storing configuration for the clone subscription;
creating, by the service infrastructure system, an association between the base subscription and the clone subscription, the association based upon a set of one or more rules, the set of one or more rules controlling how a change made to configuration for the base subscription is propagated to the configuration for the clone subscription, wherein the set of one or more rules comprises a first rule identifying a condition based upon one or more criteria, and wherein the condition further identifies a numerical threshold based upon one or more metrics;

detecting a change to the first service, wherein the change to the configuration for the base subscription;

in response to detecting the change, determining whether the condition of the first rule is satisfied; and upon determining that the condition of the first rule is satisfied based on the one or more metrics satisfying the numerical threshold, modifying the configuration for the clone subscription per the first rule, the modifying comprising modifying data stored in the data structure.

13. The system of claim 12, wherein the at least one processor further executes the computer code stored in the memory for:

receiving, from a computing device associated with the customer, data indicating a second rule in the set of one or more rules.

14. The system of claim 12, wherein the set of one or more rules including the first rule identifying the condition based upon the one or more criteria is included in the data structure for the clone subscription.

15. The system of claim 12, wherein the one or more criteria comprises satisfying a threshold defined based on a first operation performed on the configuration of the base subscription;

wherein the at least one processor further executes the computer code stored in the memory for:

determining, from a set of candidate operations and based on the first operation performed on the configuration for the base subscription, a second operation to be performed on the clone subscription; and modifying the configuration for clone subscription by at least performing the second operation.

16. The system of claim 15, wherein the set of candidate operations is determined based on at least one of: an attribute of the second service, a change in one or more metrics of the first service satisfying a predetermined threshold, or a modification in the configuration of the first service satisfying a predetermined condition.

17. The system of claim 12 wherein the service infrastructure system includes a multi-tenant environment.

18. A non-transitory computer-readable medium storing instructions executable by a processor of a computer system for:

providing multiple services in a service infrastructure system;

enabling a customer to access a first service in the multiple services via a base subscription;

receiving a request by the customer to access a second service;

establishing, in response to the request, a clone subscription that is cloned from the base subscription, the cloned subscription enabling the customer to access the second service that is cloned from the first service;

generating a data structure for storing configuration for the clone subscription;

creating, by the service infrastructure system, an association between the base subscription and the clone subscription, the association based upon a set of one or more rules, the set of one or more rules controlling how a change made to configuration for the base subscription is propagated to the configuration for the clone subscription, wherein the set of one or more rules comprises a first rule identifying a condition based upon one or more criteria, and wherein the condition further identifies a numerical threshold based upon one or more metrics;

detecting a change to the first service, wherein the change to the configuration for the base subscription;

in response to detecting the change, determining whether the condition of the first rule is satisfied; and upon determining that the condition of the first rule is satisfied based on the one or more metrics satisfying the numerical threshold, modifying the configuration for the clone subscription per the first rule, the modifying comprising modifying data stored in the data structure.

19. The non-transitory computer-readable medium of claim 18, wherein creating an association between the base subscription and the clone subscription includes associating a life cycle of the base subscription with a life cycle of the clone subscription.

* * * * *

UNITED STATES PATENT AND TRADEMARK OFFICE
CERTIFICATE OF CORRECTION

PATENT NO. : 10,148,530 B2  
APPLICATION NO. : 14/624356  
DATED : December 4, 2018  
INVENTOR(S) : Chatterjee et al.

Page 1 of 1

It is certified that error appears in the above-identified patent and that said Letters Patent is hereby corrected as shown below:

On the Title Page

On page 6, Column 2, under Other Publications, Line 5, after "Customizing" delete "Management".

On page 6, Column 2, under Other Publications, Line 6, after "Lifecycle" insert -- Management --.

In the Specification

In Column 37, Line 56, delete "1010" and insert -- 1010. --, therefor.

Signed and Sealed this  
Seventeenth Day of December, 2019

Andrei Iancu  
*Director of the United States Patent and Trademark Office*